US006828803B2

(12) United States Patent
Ichimasa et al.

(10) Patent No.: US 6,828,803 B2
(45) Date of Patent: Dec. 7, 2004

(54) STROBE CHARGE APPARATUS

(75) Inventors: Shoji Ichimasa, Kanagawa (JP); Yoshiaki Honda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/207,504

(22) Filed: Jul. 29, 2002

(65) Prior Publication Data

US 2003/0025510 A1 Feb. 6, 2003

(30) Foreign Application Priority Data

Aug. 2, 2001 (JP) ........................................ 2001-234902
Aug. 14, 2001 (JP) ........................................ 2001-246124
Jan. 30, 2002 (JP) ........................................ 2002-020818

(51) Int. Cl.[7] ........................ G02R 27/26; H02M 3/335; G03B 7/26

(52) U.S. Cl. ...................... 324/678; 363/21.12; 396/206

(58) Field of Search ................................. 396/205, 206, 396/221, 278, 279, 303, 61, 171, 173, 176, 177, 178, 179, 155; 363/21.12, 97, 21.01, 131; 324/678, 546, 547, 713

(56) References Cited

U.S. PATENT DOCUMENTS 5,780,976 A * 7/1998 Matsuo .................... 315/241 P
5,913,085 A * 6/1999 Yamaguchi et al. ......... 396/205
6,154,473 A * 11/2000 Watanabe ................. 372/38.02
6,219,493 B1 * 4/2001 Aoki et al. .................. 396/206
6,304,464 B1 * 10/2001 Jacobs et al. ............ 363/21.12
6,344,983 B1 * 2/2002 Glennon ................... 363/21.12
6,584,286 B2 * 6/2003 Odaka et al. ............... 396/206
6,728,117 B2 * 4/2004 Schemmann et al. .... 363/21.12

* cited by examiner

*Primary Examiner*—Anjan Deb
*Assistant Examiner*—Hoai-An D. Nguyen
(74) *Attorney, Agent, or Firm*—Cowan, Liebowitz & Latman, P.C.

(57) ABSTRACT

This invention relates to a strobe charge apparatus for charging a capacitor using a flyback transformer.

This invention provides a strobe charge apparatus which has a switching element that switches when a charge current that flows through a secondary coil becomes equal to or lower than a predetermined value, and starts energization to a first coil immediately after it is detected that the current that flows through the secondary coil disappears.

12 Claims, 26 Drawing Sheets

| |
|---|
| FIG. 8A |
| FIG. 8B |

| |
|---|
| FIG. 24A |
| FIG. 24B |

STROBE CHARGE APPARATUS

BACKGROUND OF THE INVENTION

1. Field of the Invention

The present invention relates to an improvement in a strobe charge apparatus which is equipped in, e.g., a camera, and comprises a flyback booster circuit.

2. Description of Related Art

Conventionally, an embodiment of Published Japanese Translation of a PCT Application No. 6-504182 discloses a booster circuit shown in FIG. 25. This prior art discloses a technique for charging in a so-called continuous mode in which the ON time of a primary-side circuit is set to be a predetermined duration, the current level of a secondary-side circuit is detected by a comparator 1002 and resistor 1003, and an operation is made based on detection of a predetermined current level.

However, in the prior art described in Published Japanese Translation of a PCT Application No. 6-504182, the comparator 1002 is required to detect the current that flows on the secondary side of a transformer 1001, as shown in FIG. 25. For this purpose, a comparator must be incorporated in a control IC, or a comparator element must be mounted. The resistor 1003 that makes current detection is connected to a node between ground (GND) and the transformer 1001, and a voltage is detected at a position V in FIG. 25. Therefore, V generated by the resistor 1003 when a secondary current flows has a negative potential with respect to GND. That is, a comparison voltage Vref of the comparator 1003 requires a negative potential, and a power supply arrangement which has a negative potential that forms Vref is required as a power supply of a camera. Hence, the circuit scale increases.

SUMMARY OF THE INVENTION

One aspect of the invention is to provide a charge apparatus which comprises a flyback booster circuit that intermittently supplies a current to a primary coil of a transformer, and supplies a charge current from a secondary coil of the transformer to a capacitor during a period in which no current flows through the primary coil, wherein the apparatus includes, as a detection circuit arrangement for detecting a current that flows through the secondary coil, a switching element which changes from a first state to a second state when the current that flows through the secondary coil becomes equal to or lower than a predetermined value, and current supply to the primary coil starts in response to switching of the switching element from the first state to the second state.

One aspect of the invention is to provide a charge apparatus, which has, as a detection circuit arrangement for detecting a current that flows through the secondary coil, a first diode, the cathode of which is connected to a terminal opposite to a terminal of the secondary coil, which is connected to a positive electrode of the capacitor, and a second diode to which the anode and cathode of the first diode are connected, and the anode of which is connected to a negative electrode of the capacitor, wherein when the detection circuit detects that the current that flows through the secondary coil becomes equal to or lower than a predetermined value, current supply to the primary coil starts.

One aspect of the invention is to provide a charge apparatus which comprises a flyback booster circuit that intermittently supplies a current to a primary coil of a transformer, and supplies a charge current from a secondary coil of the transformer to a capacitor during a period in which no current flows through the primary coil, wherein the apparatus comprises a control circuit which has a first operation mode for controlling the current supply start timing to the primary coil in accordance with a current that flows through the secondary coil, and a second operation mode for controlling the current supply timing to the primary coil independently of the current that flows through the primary coil, so as to make an appropriate charge operation.

Other objects of the present invention will become apparent from the following description of preferred embodiments taken in conjunction with the accompanying drawings.

DETAILED DESCRIPTION OF THE PREFERRED EMBODIMENTS

The present invention will be described in detail hereinafter by way of its illustrated embodiments.

(First Embodiment)

Figure 1:
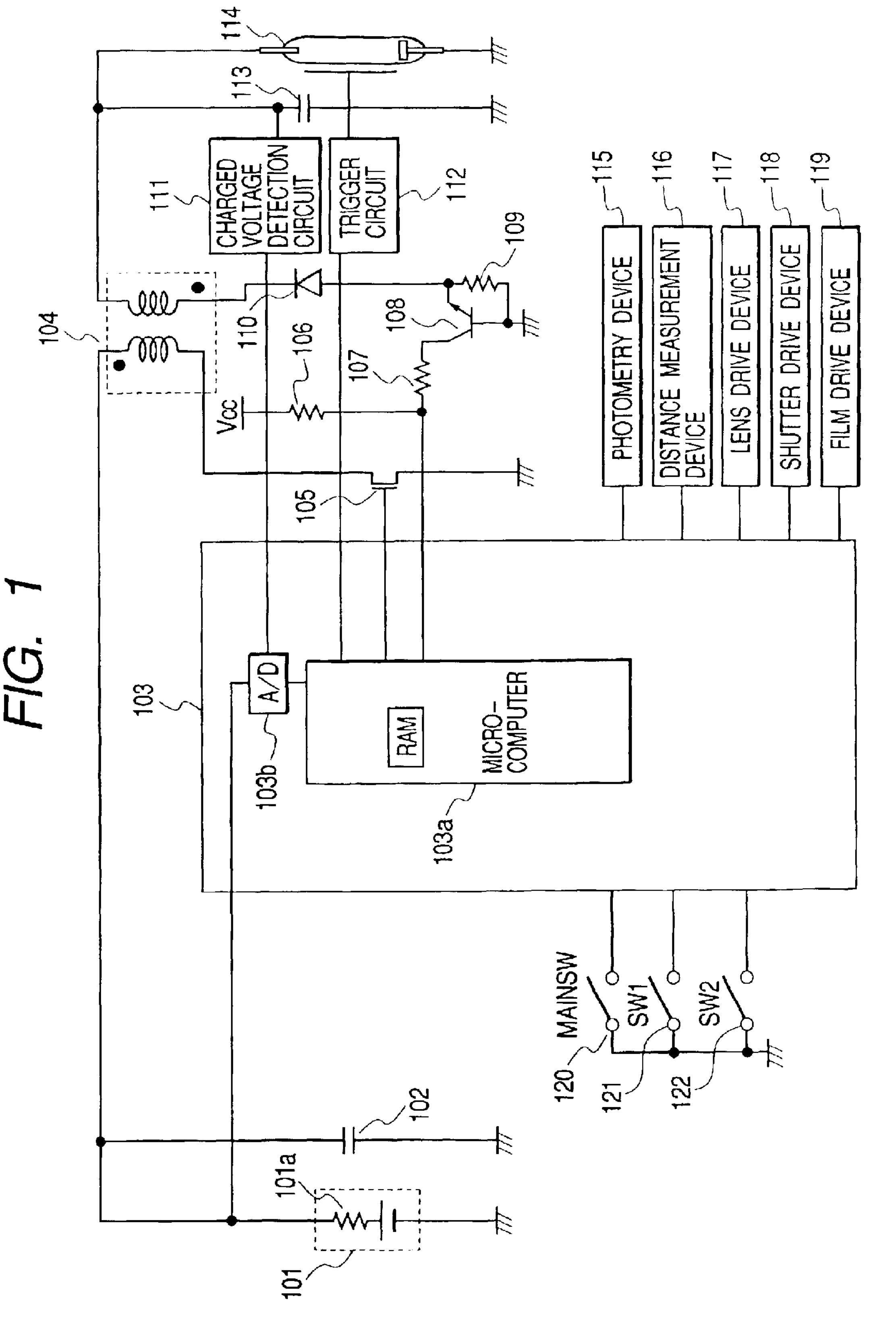
FIG. 1 is a block diagram showing the circuit arrangement according to the first embodiment of the present invention.

FIG. 1 is a block diagram showing the arrangement of a flyback booster circuit and a camera control/drive system according to the first embodiment of the present invention.

Referring to FIG. 1, a battery 101 serves as a power supply, and includes a power supply internal resistor 101*a*. A capacitor 102 is connected in parallel with the battery 101. A control IC 103 controls a camera sequence such as photometry, distance measurement, lens drive, film feed, and the like of a camera, and also a strobe device. A microcomputer 103*a* has a RAM serving as a memory, and controls the camera sequence. An A/D converter 103*b* converts an input voltage into digital data. A transformer 104 accumulates energy in a core by flowing a current in a loop of the positive electrode of the battery, a primary coil, and the negative electrode of the battery, and generates a counter electromotive force by that energy.

A FET (field effect transistor) 105 turns on/off a power supply to be supplied to the primary coil of the transformer 104. A resistor 106 has one terminal, which is connected to the input side of the control IC 103, and the other terminal, which is connected to an auxiliary power supply Vcc side, that has been boosted by a DC/DC converter (not shown) to be higher than the battery voltage. A resistor 107 has one terminal, which is connected to the collector of a transistor 108 (to be described later), and the other terminal, which is connected to the control IC 103. Note that the ratio of the resistance of the resistor 106 to that of the resistor 107 is around "5 to 10" of the resistor 106 to "1" of the resistor 107. The base of the transistor 108 is connected to the negative electrode of a main capacitor 113 (to be described later), and its emitter is connected to the anode of a high-voltage rectifying diode 110. A resistor 109 is connected to the emitter-base path of the transistor 108.

A charge current loop that accumulates the counter electromotive force generated by the secondary coil of the transformer 104 on the main capacitor 113 (to be described later) is formed by the main capacitor 113, the base-emitter path of the transistor 108 including the resistor 109, and the high-voltage rectifying diode 110 (to be described below).

The cathode of the high-voltage rectifying diode 110 is connected to the tongue of the secondary coil of the transformer 104, and its anode is connected to the emitter of the transistor 108, as described above. A charged voltage detection circuit 111 is connected to the A/D converter 103*b* in the control IC 103, and detects a voltage accumulated on the main capacitor 113. A trigger circuit 112 is connected to a discharge tube 114. The main capacitor 113 accumulates a charge boosted by the transformer 104. The discharge tube 114 emits light based on a charge accumulated on the main capacitor 113 upon receiving a trigger voltage from the trigger circuit 112.

A photometry device 115 detects an object luminance. A distance measurement device 116 detects the distance to an object. A lens drive device 117 drives a photographing lens on the basis of the detection result from the distance measurement device 116 to focus an object image on the film surface. A shutter drive device 118 drives a shutter on the basis of the detection result from the photometry device 115 to expose film. A film drive device 119 automatically loads, winds up, and rewinds film. A main switch (MAINSW) 120 is used to set the camera in a photographing ready state. A switch 121 (SW1) is turned on at the first stroke position of a shutter button. When the switch SW1 is turned on, electric circuits in the camera are enabled to start operations such as photometry, distance measurement, and the like. A switch 122 (SW2) is turned on at the second stroke position of the shutter button. When the shutter SW2 is turned on, a photographing sequence starts.

The operation of the strobe charge apparatus having the flyback booster circuit (consisting of components 104 to 110) will be described below with reference to the timing charts in FIGS. 2A to 2C.

Signals shown in the timing charts in FIGS. 2A to 2C will be explained first.

Figure 2A:
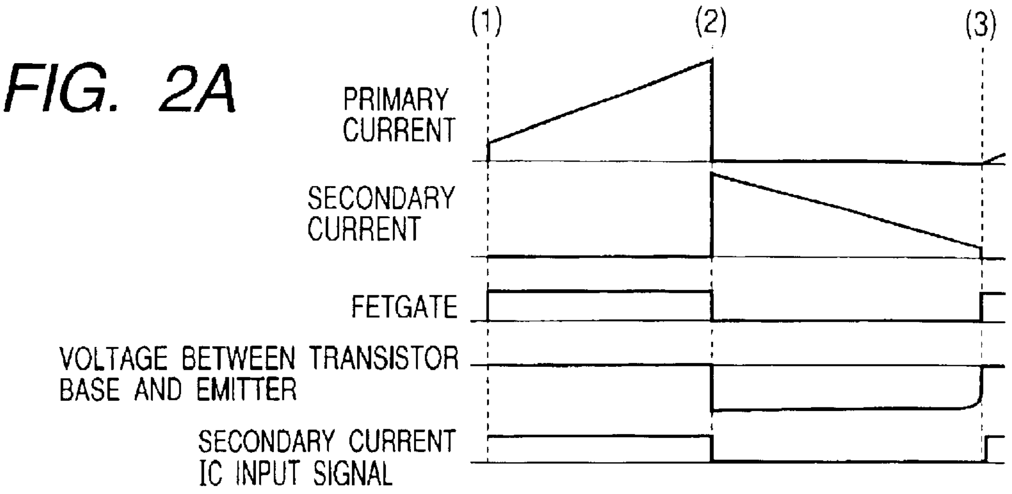
FIGS. 2A, 2B and 2C are timing charts upon executing a charge operation by a booster circuit shown in FIG. 1.
Figure 2B:
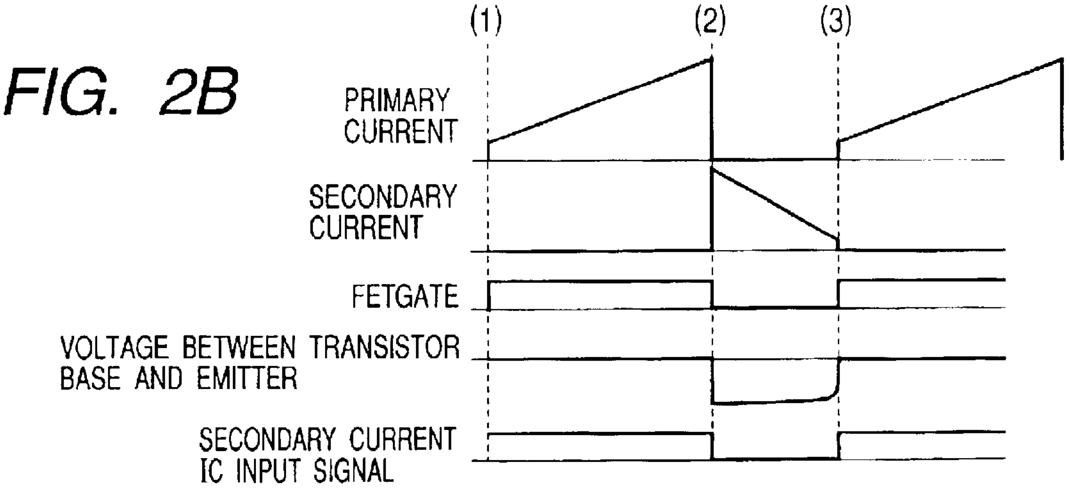
Figure 2C:
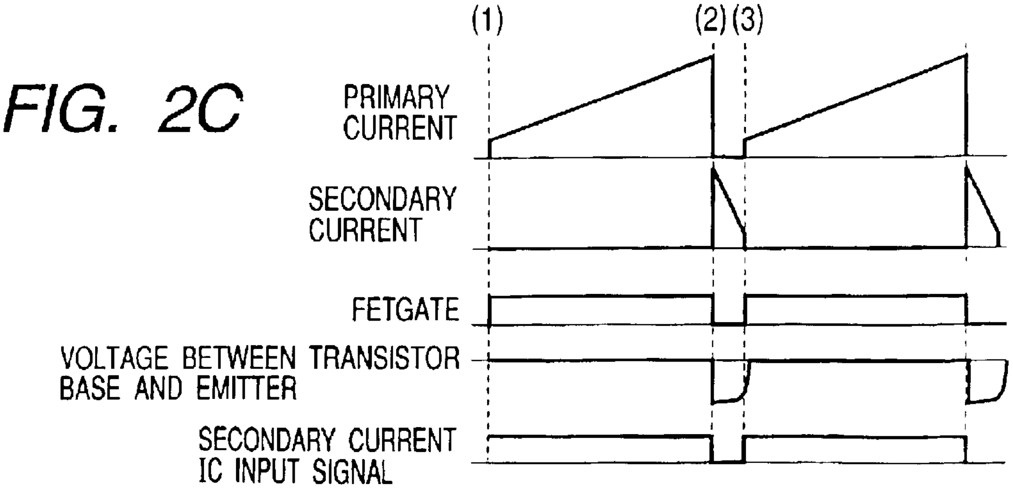

Referring to FIGS. 2A to 2C, "primary current" indicates a current that flows through the primary coil of the transformer 104. "Secondary current" indicates a current that flows through the secondary coil of the transformer 104. "FETGATE" indicates an input signal to the gate of the FET 105. "Voltage between base and emitter" indicates a base-to-emitter voltage of the transistor 108. "Secondary current IC input signal" indicates a secondary current detection signal as a collector voltage to which the resistors 106 and 107 are connected, and which is connected to the control IC 103.

FIGS. 2A, 2B, and 2C respectively show the states of signals when the charged voltage is low, middle, and high.

The operation of the booster circuit will be explained below.

The control IC 103 supplies a predetermined oscillation signal to the gate of the FET 105 via a connection terminal (timing (1) of "FETGATE" in FIGS. 2A to 2C). In this way, a high-level signal is supplied to the gate of the control electrode of the FET 105, and a current flows through a loop of the positive electrode of the battery 101, the primary coil of the transformer 104, the drain-source path of the FET 105, and the negative electrode of the battery 101 (timing (1) of "primary current" in FIGS. 2A to 2C). As a result, an induced electromotive force is generated at the secondary coil of the transformer 104. In this case, since this current has a polarity blocked by the high-voltage rectifying diode 110, no excitation current flows from the transformer 104, and energy is accumulated in the core of the transformer 104. This energy accumulation (current drive) is done from the beginning of drive to a predetermined time measured by a timer (to timing (2) of "FETGATE" in FIGS. 2A to 2C).

After current drive has been done to the predetermined time, the gate of the FET 105 is set at low level to turn off the FET 105 (timing (2) of "FETGATE" in FIGS. 2A to 2C), thus cutting off the current and disabling the circuit. As a result, a counter electromotive force is generated in the secondary coil of the transformer 104. In response to this counter electromotive force, a secondary current flows from the transformer 104 in the loop of the main capacitor 113, the transistor 108 and resistor 109, and the high-voltage rectifying diode 110 (timing (2) to timing (3) of "secondary current" in FIGS. 2A to 2C), thereby accumulating a charge on the main capacitor 113.

The emitter-base voltage of the transistor 108 becomes a signal which has a potential difference from the resistor 109 due to generation of the secondary current. When the potential different has reached Vbe (base-to-emitter voltage) of the transistor 108 (timing (2) of "voltage between base and emitter" in FIGS. 2A to 2C), the transistor 108 is turned on, and the secondary current IC input signal that has been pulled up to the power supply Vcc by the resistor 106 changes to low level at nearly the same time with the start of emission of the secondary current (timing (2) of "secondary current IC input signal" in FIGS. 2A to 2C).

Since energy accumulated in the transformer 104 is emitted, and the secondary current that flows through the transistor 108 and resistor 109 drops to a predetermined current (Vbe voltage) (timing (3) of "voltage between base and emitter" in FIGS. 2A to 2C) (timing (3) of "secondary current" in FIGS. 2A to 2C), the secondary current IC input signal that maintains low level is inverted from low level to high level (timing (3) of "secondary current IC input signal" in FIGS. 2A to 2C).

In response to the secondary current IC input signal which has been inverted from low level to high level, the control IC 103 generates a high-level signal to the gate of the FET 105 to enable the FET 105 again (timing (1) of "FETGATE" in FIGS. 2A to 2C) as in the aforementioned primary current drive, thus accumulating energy in the transformer 104 for a predetermined period of time. After an elapse of the predetermined period of time, the FET 105 is disabled by a low-level signal to make the transformer 104 emit the accumulated energy, thus accumulating a charge on the main capacitor 113.

By repeating the aforementioned operations:

(1) start primary current drive (timing (1) of timing chart in FIGS. 2A to 2C);

(2) stop primary current drive after an elapse of a predetermined period of time (timing (2) of timing chart in FIGS. 2A to 2C);

(3) detection of the secondary current that has reached a predetermined current (timing (3) of timing chart in FIGS. 2A to 2C); and (4) start primary current drive (timing (1) of timing chart in FIGS. 2A to 2C (timing (1) and timing (2) in FIGS. 2A to 2C have nearly the same timings)), the charged voltage of the main capacitor 113 rises.

The charge operation in the first embodiment has been explained.

Note that the "predetermined current" of the secondary current is the sum of a current with which a voltage generated in response to a current which flows through the resistor 109 reaches the base-to-emitter voltage Vbe of the transistor 108, and a base current with which the collector of the transistor 108, to which the resistors 106 and 107 pulled up to the power supply Vcc are connected, changes to low level.

For example, if the resistors 106 and 107 as pull-up resistors are respectively 1 kΩ and 150 Ω, a current that flows through the collector of the transistor 108 is "(5−Vce (collector-to-emitter voltage))/(1000+150)" if the power supply Vcc is 5 V, and Vce at that time is a very low voltage. Hence, "5/(1000+150)≈4.3 mA". Therefore, the base current of the transistor 108 if about 0.14 mA if the hfe (current amplification ratio) of the transistor 108 is around 30. At this time, if a peak current (a current at timing (2) of "primary current" in FIGS. 2A to 2C) that flows through the primary coil is 3 A, a peak (a current at timing (2) of "secondary current" in FIGS. 2A to 2C) of the secondary current that flows through the transformer 104 depends on the turn ratio (Ratio) between the primary and secondary coils and is, for example, around 150 mA when the number of turns of the secondary coil is "26" with respect to the primary coil "1" (Ratio=1:26). If the predetermined current to be detected is 50 mA around ⅓ the peak of the secondary current, the actual detection value of the secondary current is 50.14 mA.

In this way, upon setting the predetermined current, the influence of the base current of the transistor 108 is very small and negligible. That is, the predetermined current can be set by "predetermined current≈ Vbe/resistance of resistor 109". Hence, the resistance of the resistor 109 can be calculated by "Vbe/predetermined current". In such case, if Vbe is 0.6 V, the resistance of the resistor 109 is 12 Ω (Vbe=base-to-emitter voltage of transistor).

Figure 3:
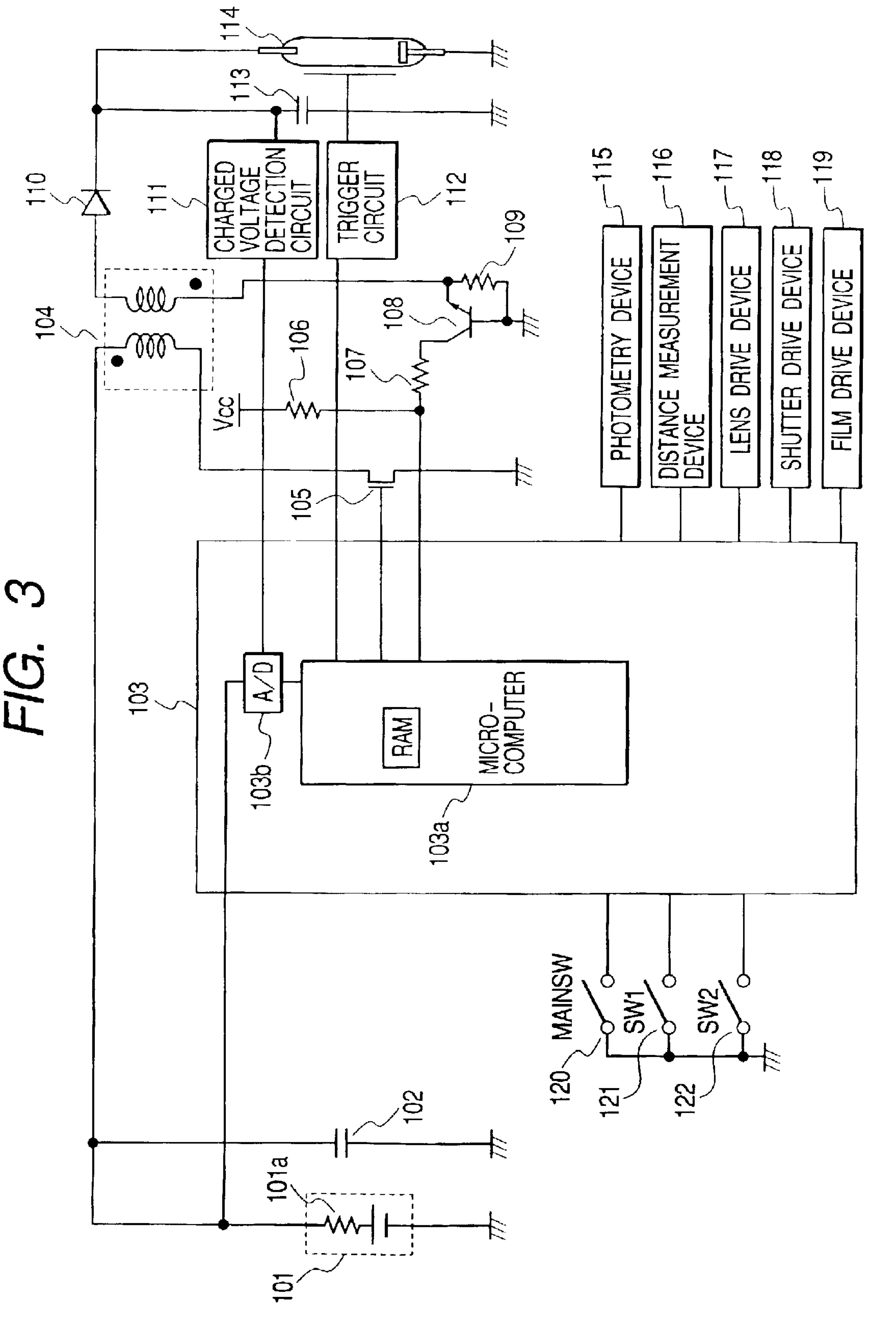
FIG. 3 is a block diagram showing an example of the circuit arrangement to be explained in contradistinction to that shown in FIG. 1.

In secondary current detection while energy remains in the transformer 104 as in the above charge method, especially, energy that produces noise in the transformer 104 also becomes large. Hence, the secondary current is detected on the GND side of the transformer 104. If the high-voltage rectifying diode 110 is inserted on the (+) side of the transformer 104 in this embodiment, as shown in FIG. 3 (FIG. 3 is a virtual circuit diagram in contradistinction to FIG. 1, and this circuit is not the prior art of the present application), an oscillating current due to the stray capacitance on the primary side of the transformer is superposed on the resistor 109 that detects the secondary current, at the beginning of drive of the primary current. Hence, the circuit arrangement that cuts off the oscillation current loop generated upon primary current simultaneous drive by the high-voltage rectifying diode 110, as shown in FIG. 1, is preferably adopted.

Figure 4:
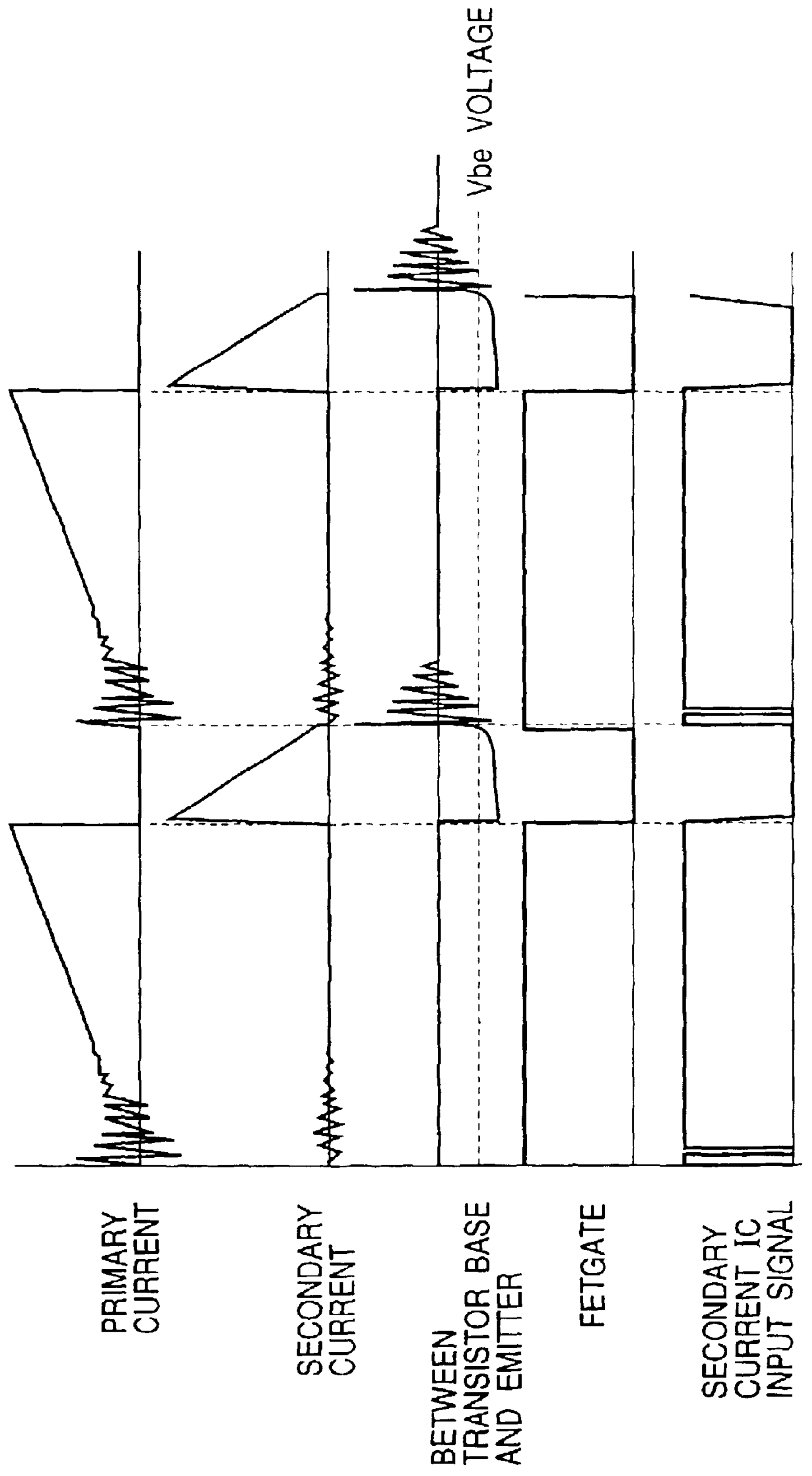
FIG. 4 is a timing chart of the charge operation by the circuit arrangement shown in FIG. 3.
Figure 5:
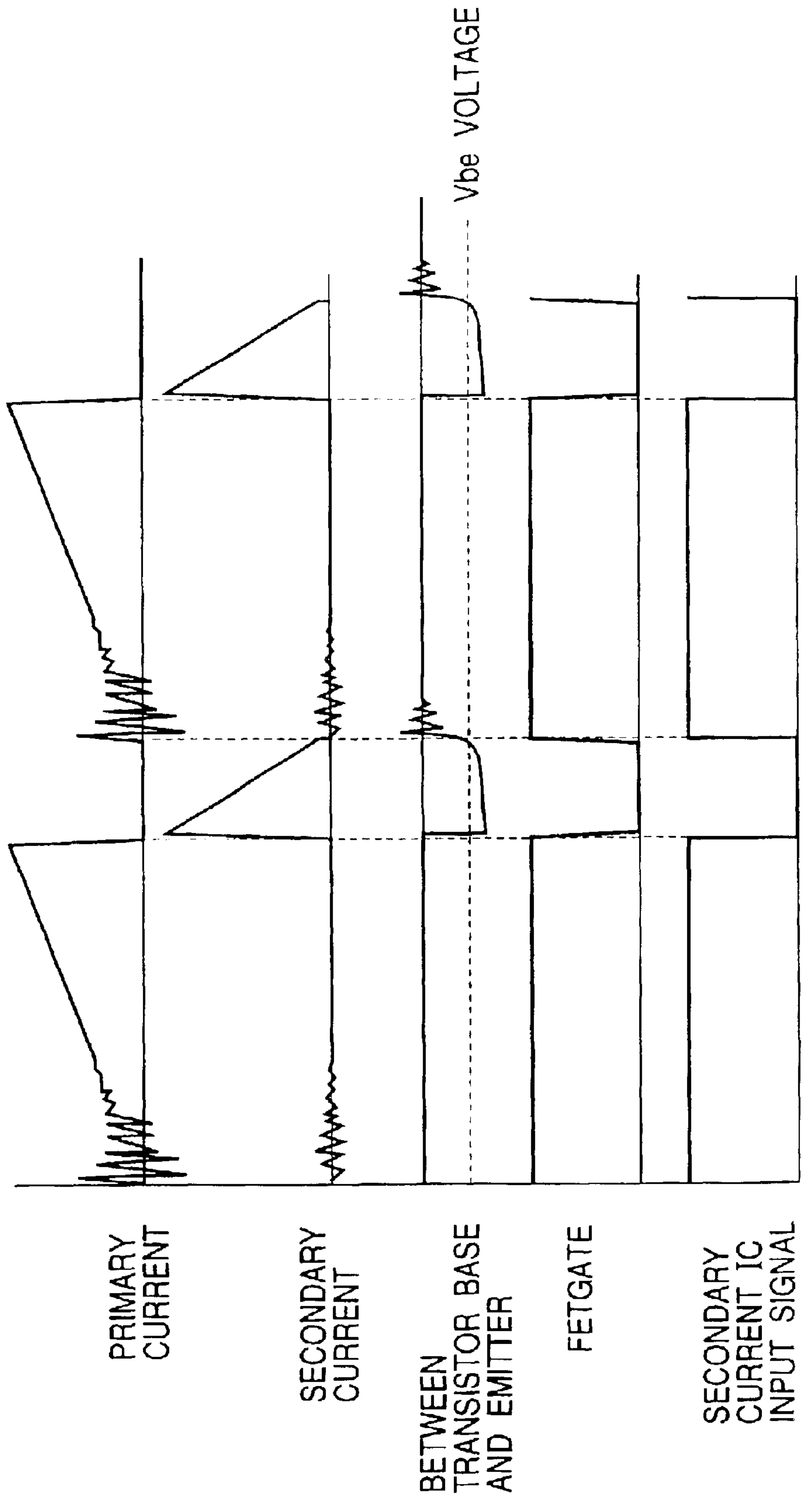
FIG. 5 is a timing chart of the charge operation by the circuit arrangement of FIG. 1 as the first embodiment of the present invention.

FIGS. 4 and 5 respectively show the waveforms of the signals in case of the circuit arrangements shown in FIG. 3 and FIG. 1.

Upon examining the waveforms shown in FIG. 4, the base-to-emitter signal of the transistor 108 is directly influenced by noise of an oscillating current due to the stray capacitance on the primary side of the transformer 104, which is generated at the beginning of drive of the primary current, and noise exceeds Vbe. For this reason, the secondary current IC input signal as the collector signal erroneously detects a detection signal, as shown in FIG. 4.

By contrast, upon examining the waveforms shown in FIG. 5, the base-to-emitter signal of the transistor 108 is free from the influence of noise of an oscillating current due to the stray capacitance on the primary side of the transformer 104, which is generated at the beginning of drive of the primary current, since that noise is blocked by the high-voltage rectifying diode 110. Hence, noise never exceeds Vbe, and the secondary current IC input signal as the collector signal is obtained as a signal free from any operation errors, as shown in FIG. 5, thus allowing the stable operation of the circuit.

The operation of the camera with the above arrangement will be explained below with reference to the flow charts in FIGS. 6 to 8A and 8B.

The operation executed when the main switch (MAINSW) 120 is turned on will be described first using the flow chart in FIG. 6.

Figure 6:
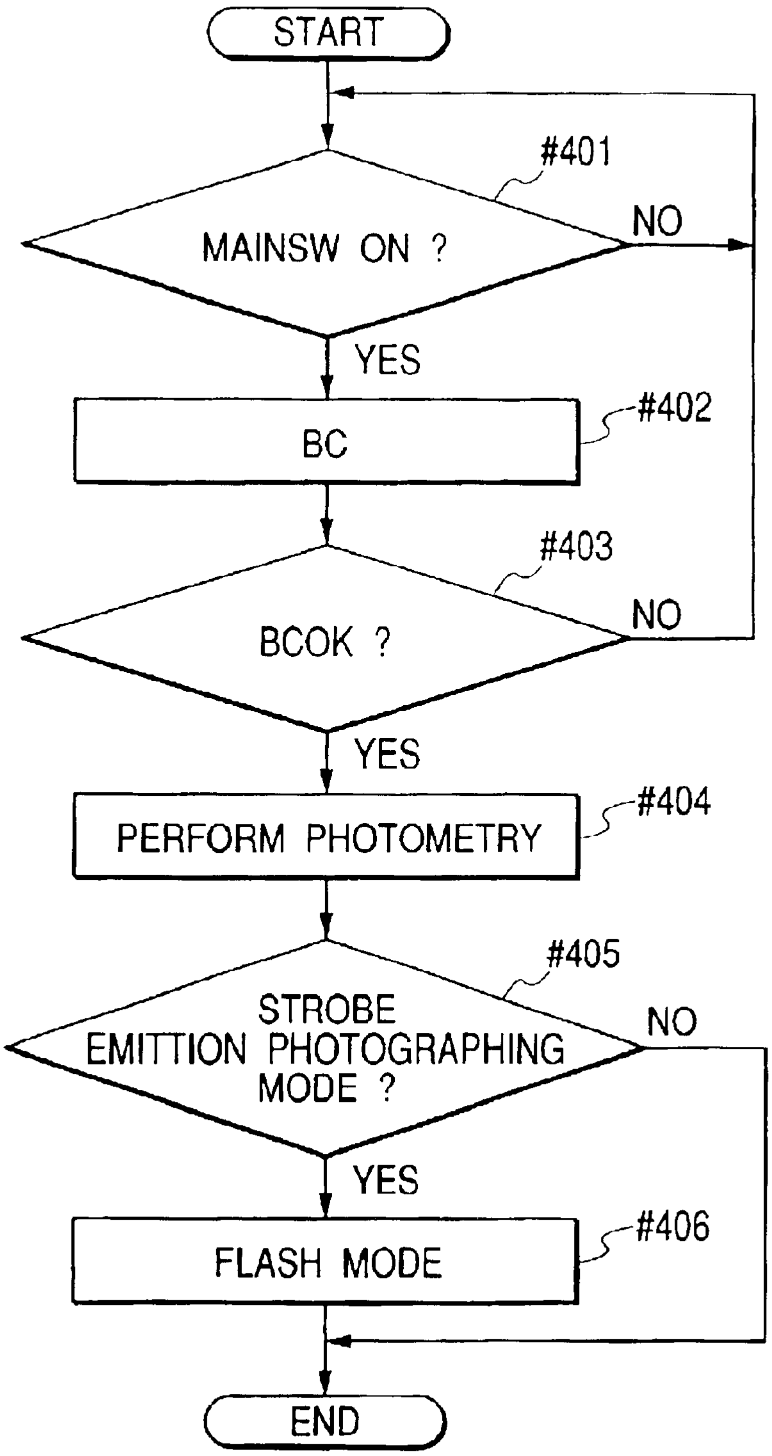
FIG. 6 is a flow chart showing the operation when a main switch is turned on in the first embodiment of the present invention.

It is checked in step #401 in FIG. 6 if the main switch 120 is ON. If NO in step #401, the control stands by in this step. After that, if the main switch 120 is ON, the flow advances to step #402 to execute battery check (BC) so as to check if the battery voltage of the camera is high enough to make the camera operations. The battery check result is stored in the RAM in the microcomputer 103*a*. It is then checked in step #403 based on the battery check result stored in the RAM if the battery voltage allows camera operations. If YES in step #403, the flow advances to step #404; otherwise, an alarm or the like is generated, and the flow returns to step #401.

If the battery voltage is high enough, and the flow advances to step #404, the photometry device 115 is driven to detect the object luminance (photometry operation), and the obtained photometry result is stored in the RAM in the microcomputer 103*a*. It is checked in step #405 if the photometry result stored in the RAM indicates a photometry state that requires strobe emission upon photographing, i.e., a strobe emission photographing mode. If NO in step #405 (if neither strobe emission nor strobe pre-charge are required), this sequence ends. On the other hand, if YES in step #405 (i.e., if the object luminance requires strobe emission, and strobe pre-charge is required), the flow advances to step #406 as a flash mode to perform a strobe charge operation.

The strobe charge operation in the flash mode in step #406 will be explained below with reference to the flow chart in FIG. 7.

Figure 7:
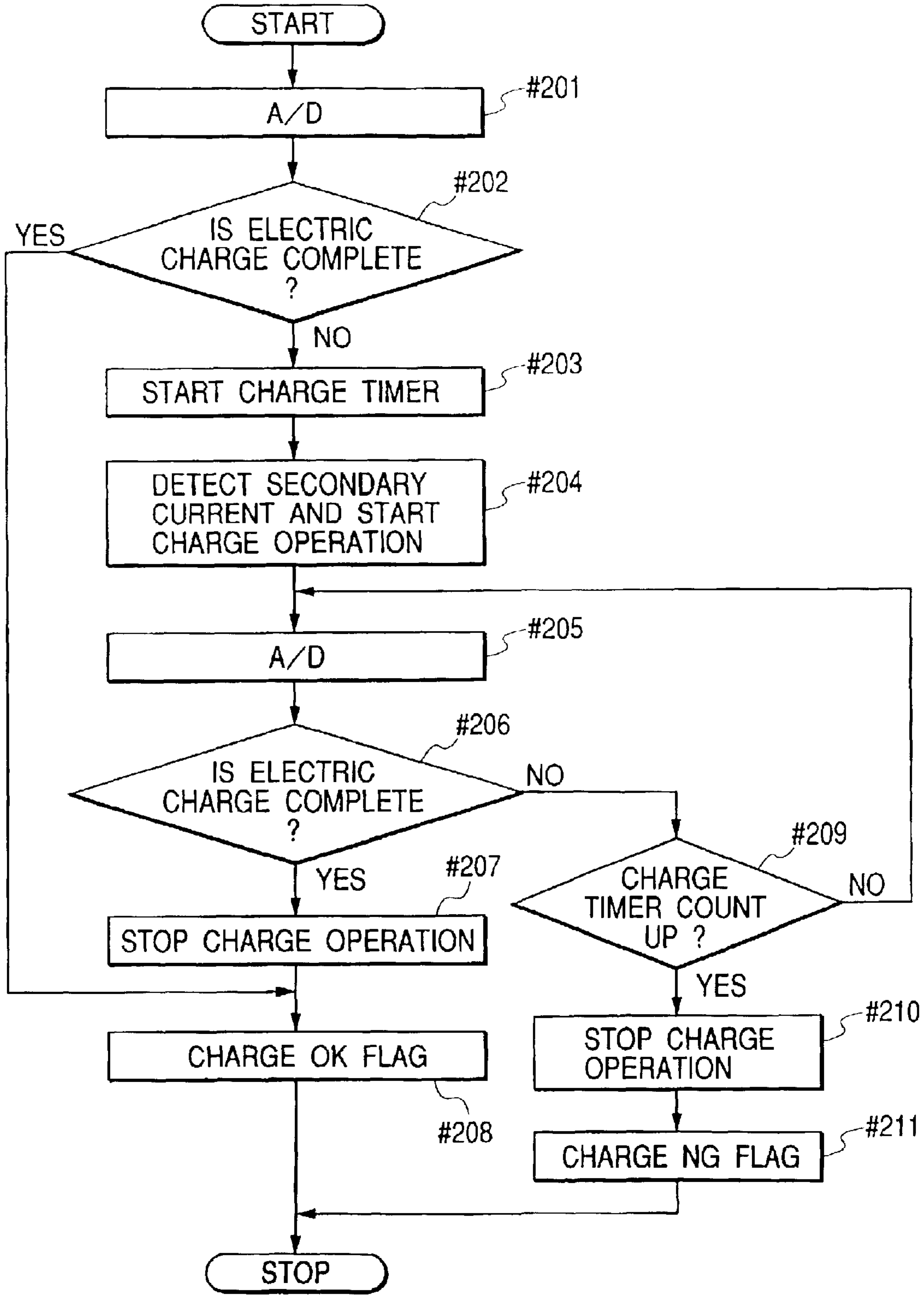
FIG. 7 is a flow chart showing the charge operation in the first embodiment of the present invention.

When the control enters the flow chart in FIG. 7, the charged voltage of the main capacitor 113 is detected in step #201. More specifically, the charged voltage of the main capacitor 113 is detected by the charged voltage detection circuit 111, is fetched as a digital value via the A/D converter 103*b* in the control IC 103, and the digital value is stored in the RAM in the microcomputer 103*a*. It is checked in step #202 based on the charged voltage stored in the RAM if a charge operation is required (charge operation is complete). As a result, if YES in step #202, the flow jumps to step #208 to set a charge OK flag, thus ending the flash mode.

On the other hand, if it is determined in step #202 that a charge operation is not complete yet, the flow advances to step #203 to start a charge timer used to measure a charge time. In step #204, the aforementioned operations:

(1) start primary current drive (timing (1) of timing chart in FIGS. 2A to 2C);

(2) stop primary current drive after an elapse of a predetermined period of time (timing (2) of timing chart in FIGS. 2A to 2C);

(3) detection of the secondary current that has reached a predetermined current (timing (3) of timing chart in FIGS. 2A to 2C); and (4) start primary current drive (timing (1) of timing chart in FIGS. 2A to 2C (timings (1) and (3) of timing chart in FIGS. 2A to 2C have nearly the same timings)), i.e., the charge operations, are executed.

After that, the flow advances to step #205 to detect the charged voltage of the main capacitor 113 again. That is, the charged voltage of the main capacitor 113 is detected by the charged voltage detection circuit 111, is fetched as a digital value via the A/D converter 103*b* in the control IC 103, and the digital value is stored in the RAM in the microcomputer 103*a*. It is checked in step #206 based on the charged voltage stored in the RAM if the charge operation is complete. As a result, if YES in step #206, the flow advances to step #207 to stop the charge operation, and a charge OK flag is set in step #208, thus ending the flash mode.

On the other hand, if it is determined in step #206 that the charge operation is not complete yet, the flow advances to step #209 to check if the charge timer that has started in step #203 has measured a predetermined time (count up). If YES in step #209, the flow advances to step #210 to stop the charge operation, and a charge NG flag is set in step #211, thus ending the flash mode.

On the other hand, if the charge timer has not measured the predetermined time, the flow returns to step #205, and detection of completion of the charge operation and checking of whether or not the charge timer has measured the predetermined time are repeated while fetching the charged voltage that has been started in step #204 (#205→#206→#209→#205). After that, if it is determined in step #206 that the charge operation is complete, steps #207 and #208 described above are executed; if it is determined in step #209 that the charge timer has measured the predetermined time, steps #210 and #211 mentioned above are executed, thus ending the flash mode.

Figures 8, 8A:
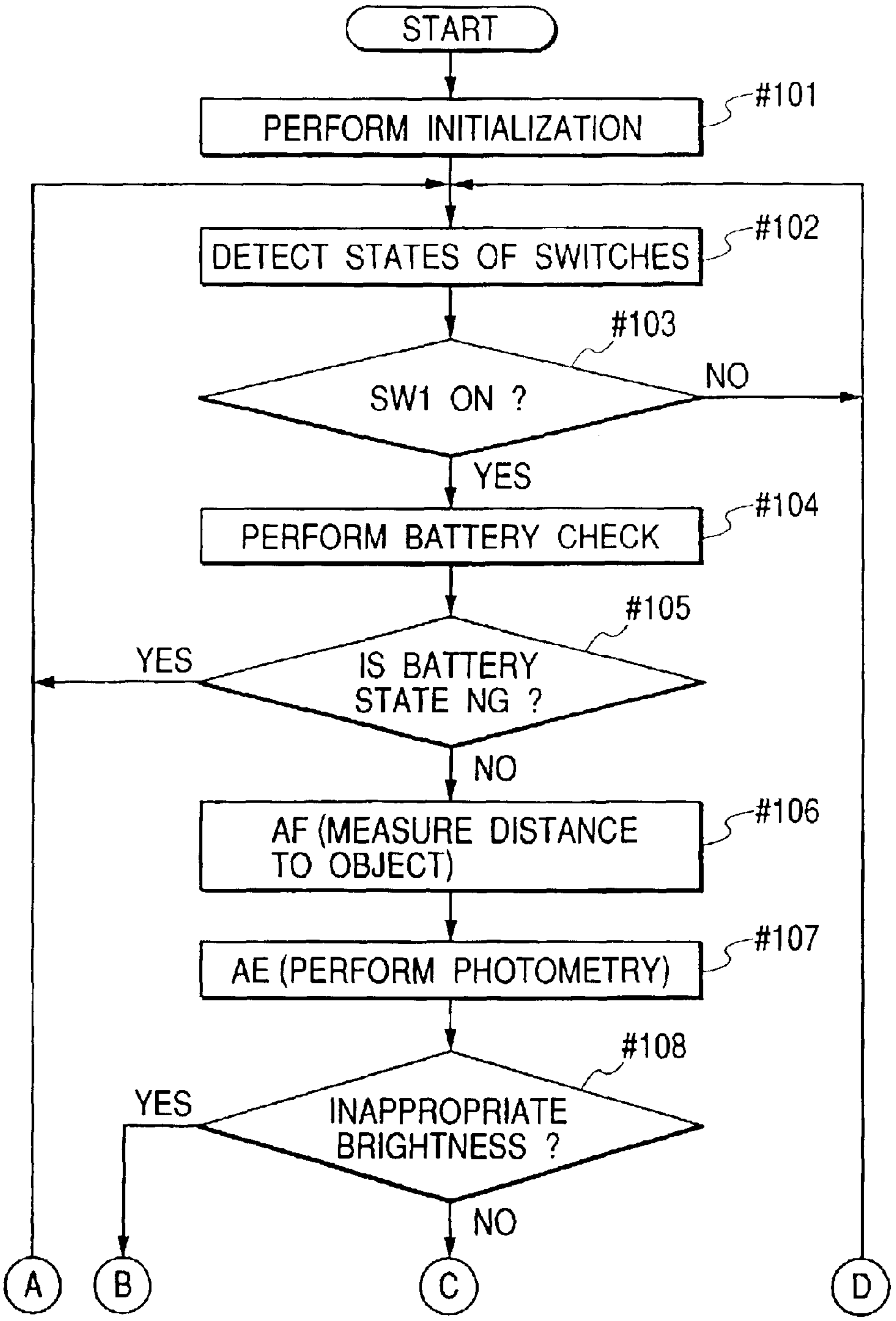
FIG. 8 is comprised of FIGS. 8A and 8B showing a flowchart explaining a series of operation of a camera in the first embodiment of the present invention.
Figure 8B:
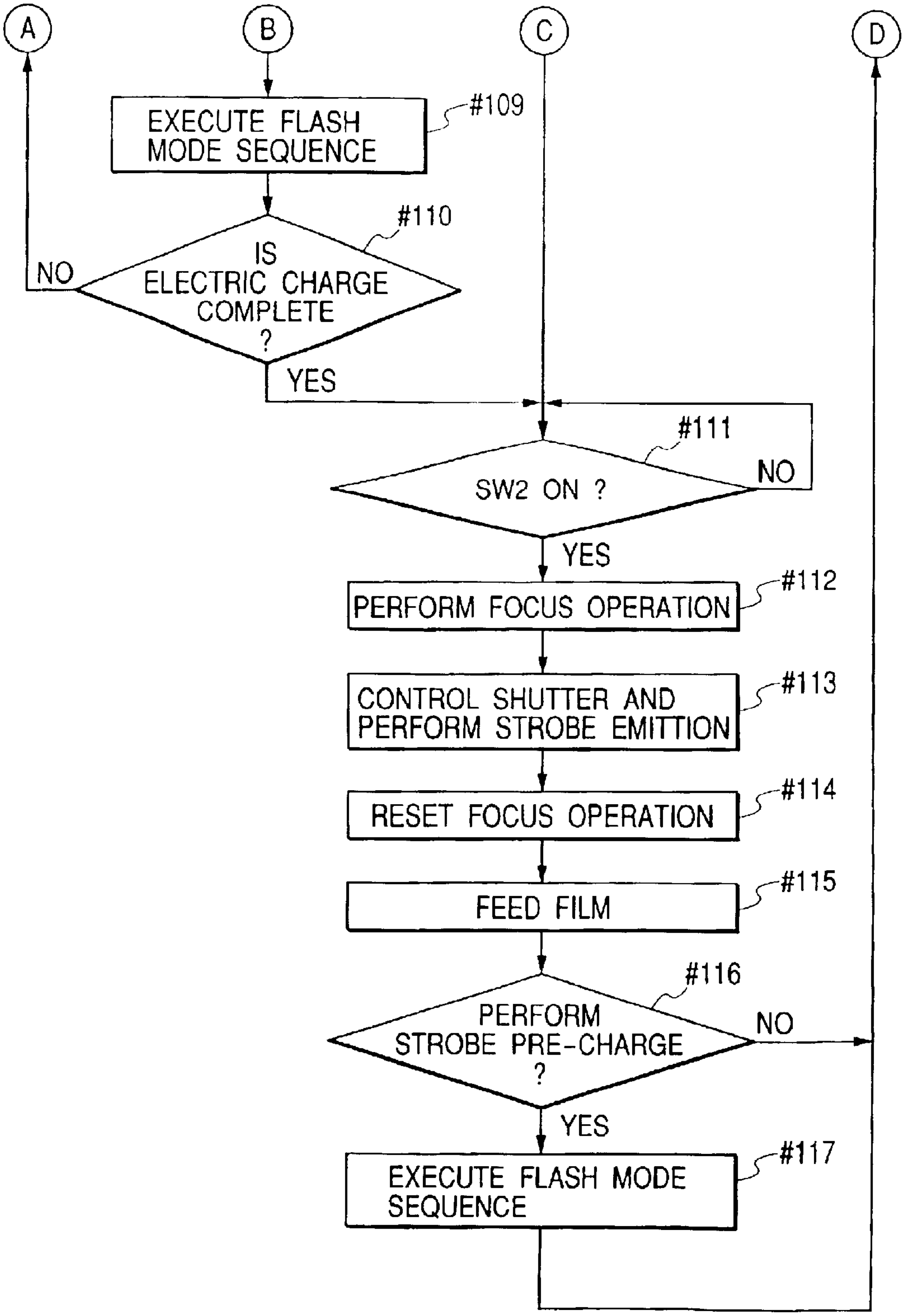

The release sequence of the camera will be described below using the flow chart in FIG. 8.

The microcomputer 103*a* is initialized in step #101, and the states of various switches are detected in step #102. In step #103, the state of the switch SW1, which is turned on at the first stroke position of the release button, is checked. If the switch SW1 is not ON, the flow returns to step #102. On the other hand, if the switch SW1 is ON, the flow advances to step #104 to execute the battery check (BC) process so as to detect if the battery voltage allows the camera operations, as in step #402 in FIG. 6. The detection result is stored in the RAM in the microcomputer 103*a*. It is then checked in step #105 based on the battery check result stored in the RAM if the battery voltage allows the camera operations. If YES in step #105, the flow advances to step #106; otherwise, the flow returns to step #102.

If the battery voltage allows the camera operations, and the flow advances to step #106, the distance measurement device 112 detects the distance to an object, and that distance measurement result is stored in the RAM in the microcomputer 103*a*. The photometry device 115 detects the object luminance in step #107, and that result (photometry result) is stored in the RAM in the microcomputer 103*a*.

After that, the flow advances to step #108 to check based on the photometry result obtained in step #107 if strobe emission is required. Strobe emission is required when a photographing environment is dark, the sun is located behind the object (backlight), and so forth. If YES in step #108, the flow advances to step #109; otherwise, the flow advances to step #111, and the control stands by until the switch SW2 is turned on.

If it is determined in step #108 that strobe emission is required, and the flow advances to step #109, the sequence of the flash mode described above using the flow chart in FIG. 7 is executed. Since this sequence is as described above, a description thereof will be omitted. After that, the flow advances to step #110 to check if the charge operation is complete. This checking step is implemented by checking if the charge OK flag is set in the sequence in step #208 in FIG. 7. If the charge OK flag is set, i.e., the charge operation is complete, the control stands by in step #111 until the switch SW2 is turned on. If the charge OK flag is not set, i.e., the charge operation is not complete, the flow returns to step S102.

If the flow advances to step #111 and it is detected in the standby state that the switch SW2 is ON, the flow advances to step #112 to perform focus adjustment of the photographing lens by the lens drive device 117 in accordance with the distance measurement result obtained in step #106. If strobe emission is required based on the photometry result obtained in step #107, the microcomputer 103*a* outputs a trigger signal, and the trigger circuit 112 outputs an emission signal to the discharge tube 114 in response to the trigger signal in step #113. As a result, the discharge tube 114 makes strobe emission based on the energy in the main capacitor 113. At the same time, the shutter drive device 118 executes shutter drive control. In step #114, a lens reset process is done, i.e., the lens at an in-focus position is returned to its initial position.

In step #115, the film drive device 119 executes film feed control to the next photographing frame. It is then checked in step #116 if a strobe pre-charge operation is to be executed. Note that the strobe pre-charge operation is not required when the result, which is determined in step #108 based on the photometry result obtained in step #107, does not indicate the flash mode. In this case, the flow returns to step #102.

If the strobe pre-charge operation is to be made, the flow advances from step #116 to step #117 to execute the aforementioned flash mode sequence. After that, the flow returns to step #102.

As a means for driving the primary current, a transistor may be used in accordance with the voltage of the drive signal of the primary current or the circuit arrangement.

(Second Embodiment)

Figure 9:
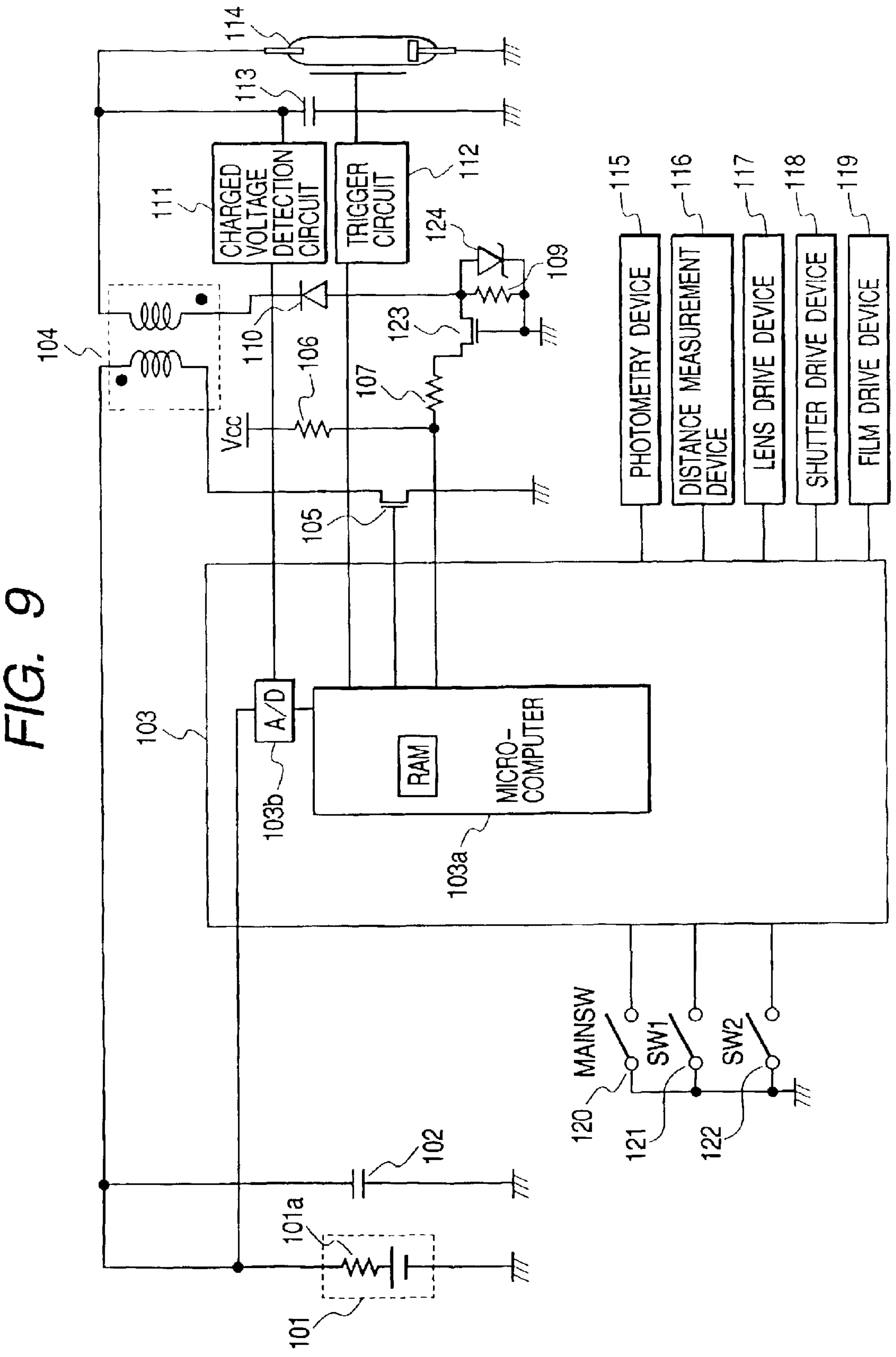
FIG. 9 is a block diagram showing the circuit arrangement according to the second embodiment of the present invention.

FIG. 9 is a block diagram showing the arrangement of a flyback booster circuit and camera control/drive system according to the second embodiment of the present invention. The same reference numerals in FIG. 2 denote the same parts as in FIG. 1, and a description thereof will be omitted.

In FIG. 9, the transistor 108 in FIG. 1 is replaced by a FET 123. Also, the resistor 109 is connected to the gate-source path of the FET 123, the anode of a constant-voltage diode 124 is connected to the source of the FET 123, and the cathode of the constant-voltage diode 124 is connected to the gate of the FET 123.

The operation of the strobe charge apparatus which comprises the flyback booster circuit will be explained below with reference to the timing charts of FIGS. 10A to 10C.

Signals shown in the timing charts in FIGS. 10A to 10C will be explained first.

Figure 10A:
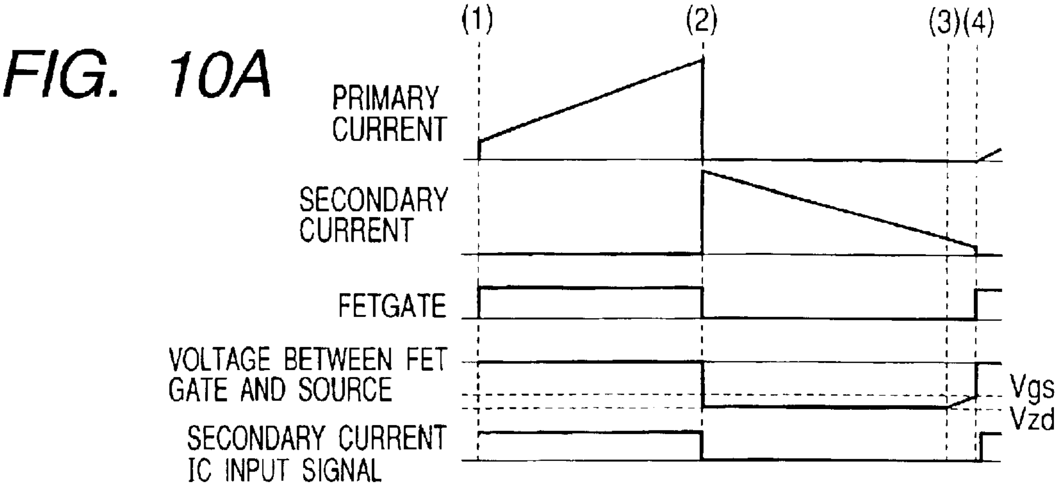
FIGS. 10A, 10B and 10C are timing charts upon executing a charge operation by a booster circuit shown in FIG. 9.
Figure 10B:
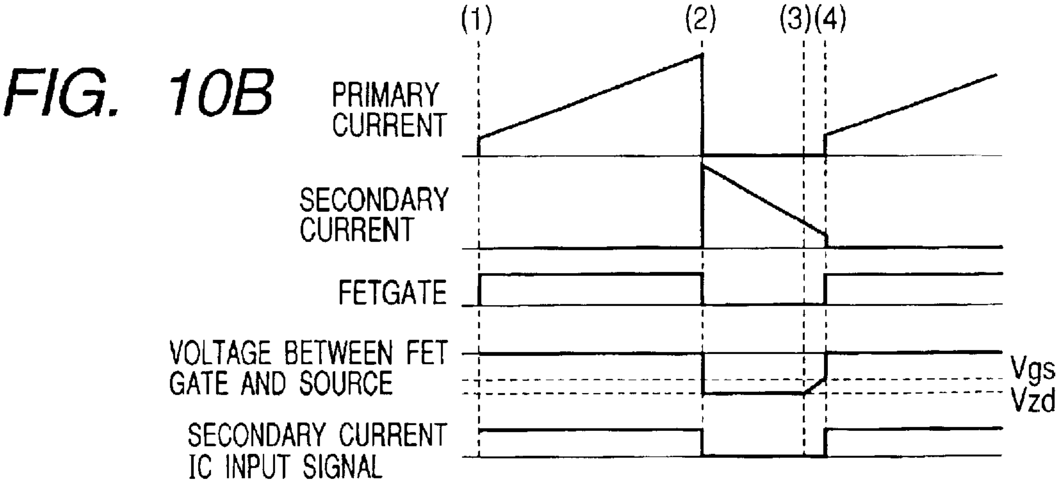
Figure 10C:
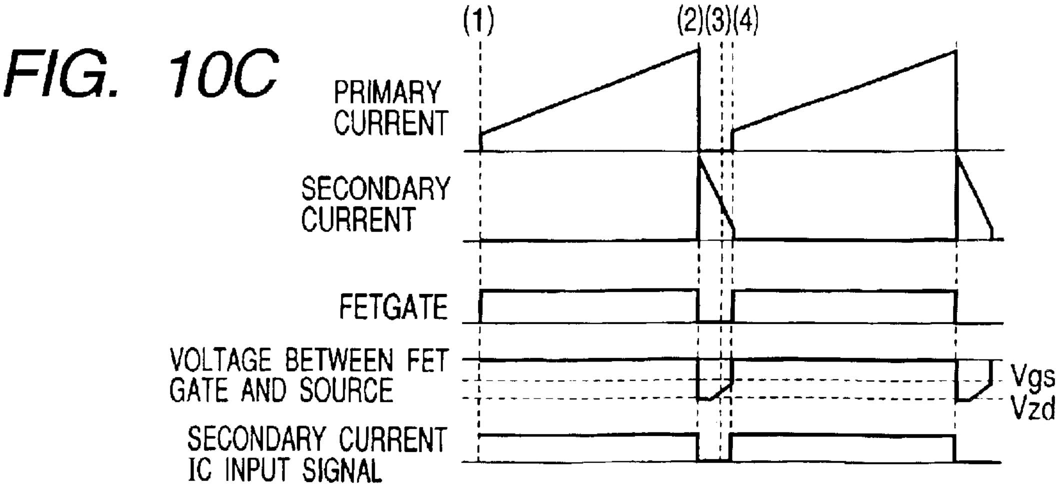

Referring to FIGS. 10A to 10C, "primary current" indicates a current that flows through the primary coil of the transformer 104. "Secondary current" indicates a current that flows through the secondary coil of the transformer 104. "FETGATE" indicates a gate input signal of the FET 105. "Voltage between FET gate and source" indicates a gate-to-source voltage of the FET 123. "Secondary current IC input signal" indicates a secondary current detection signal that flows through a line to which the resistors 106 and 107 are connected, and which is connected to the control IC 103.

FIGS. 10A, 10B, and 10C respectively show the states of signals when the charged voltage is low, middle, and high.

The operation of the booster circuit will be explained below.

The control IC 103 supplies a predetermined oscillation signal to the gate of the FET 105 via a connection terminal (timing (1) of "FETGATE" in FIGS. 10A to 10C). In this way, a high-level signal is supplied to the gate of the control electrode of the FET 105, and a current flows through a loop of the positive electrode of the battery 101, the primary coil of the transformer 104, the drain-source path of the FET 105, and the negative electrode of the battery 101 (timing (1) of "primary current" in FIGS. 10A to 10C). As a result, an induced electromotive force is generated at the secondary coil of the transformer 104. In this case, since this current has a polarity blocked by the high-voltage rectifying diode 110, no excitation current flows from the transformer 104, and energy is accumulated in the core of the transformer 104. This energy accumulation (current drive) is done from the beginning of drive to a predetermined time measured by a timer (to timing (2) of "FETGATE" in FIGS. 10A to 10C).

After current drive has been done to the predetermined time, the gate of the FET 105 is set at low level to turn off the FET 105 (timing (2) of "FETGATE" in FIGS. 10A to 10C), thus cutting off the current and disabling the circuit. As a result, a counter electromotive force is generated in the secondary coil of the transformer 104. In response to this counter electromotive force, a secondary current flows from the transformer 104 in the loop of the main capacitor 113, the resistor 109 and constant-voltage diode 124, and the high-voltage rectifying diode 110 (timing (2) to timing (3) of "secondary current" in FIGS. 10A to 10C), thereby accumulating a charge on the main capacitor 113.

The gate-to-source voltage of the FET 123 becomes a signal which has a potential difference from the resistor 109 due to generation of the secondary current. When the potential different has reached a predetermined voltage Vge (gate-to-source voltage) of the gate of the FET 123 (timing (2) of "voltage between FET gate and source" in FIGS. 10A to 10C), the FET 123 is turned on, and the secondary current IC input signal that has been pulled up to the power supply Vcc by the resistor 106 changes to low level at nearly the same time with the start of emission of the secondary current (timing (2) of "secondary current IC input signal" in FIGS. 10A to 10C). At this time, the constant-voltage diode 124 connected to the gate-source path of the FET 123 can prevent the gate-to-source voltage of the FET 123 from becoming higher than a predetermined voltage (Zener voltage) Vzd.

Since energy accumulated in the transformer 104 is emitted, and the secondary current that flows through the resistor 109 and constant-voltage diode 124 drops to be lower than the Zener voltage Vzd of the constant-voltage diode 124 (timing (3) of "voltage between FET gate and source" in FIGS. 10A to 10C), the gate-to-source voltage of the FET 123 gradually decreases. When the secondary current drops to a predetermined current (Vgs voltage) (timing (4) of "gate-to-source voltage" in FIGS. 10A to 10C), the secondary current IC input signal that maintains low level is inverted from low level to high level (timing (4) of "secondary current IC input signal" in FIGS. 10A to 10C).

In response to the secondary current IC input signal which has been inverted from low level to high level, the control IC 103 generates a high-level signal to the gate of the FET 105 to enable the FET 105 again (timing (1) of "FETGATE" in FIGS. 2A to 2C) as in the aforementioned primary current drive, thus accumulating energy in the transformer 104 for a predetermined period of time. After an elapse of the predetermined period of time, the FET 105 is disabled by a low-level signal to make the transformer 104 emit the accumulated energy, thus accumulating a charge on the main capacitor 113.

By repeating the aforementioned operations:

(1) start primary current drive (timing (1) of timing chart in FIGS. 10A to 10C);

(2) stop primary current drive after an elapse of a predetermined period of time (timing (2) of timing chart in FIGS. 10A to 10C);

(3) secondary current drop to the Vgs voltage (timing (3) of timing chart in FIGS. 10A to 10C);

(4) detection of the secondary current that has reached a predetermined current (timing (4) of timing chart in FIGS. 10A to 10C); and (5) start primary current drive (timing (1) of timing chart in FIGS. 10A to 10C (timings (1) and (4) of timing chart in FIGS. 10A to 10C have nearly the same timings)), the charged voltage of the main capacitor 113 rises.

The charge operation in the second embodiment has been explained.

Note that the "predetermined current" of the secondary current in the second embodiment is a current when a voltage generated in response to a current that flows through the resistor 109 has reached the gate-to-source voltage Vgs of the FET 123.

For example, when Vgs is 1.5 V, and a peak current to be supplied to the primary coil at that time is 3 A (timing (2) of "primary current" in FIGS. 10A to 10C), a peak (a current at timing (2) of "secondary current" in FIGS. 10A to 10C) of the secondary current that flows through the transformer 104 depends on the turn ratio (Ratio) between the primary and secondary coils and is, for example, around 150 mA when the number of turns of the secondary coil is "26" with respect to the primary coil "1" (Ratio=1:26). If the predetermined current is set to be 50 mA roughly ⅓ the peak of the secondary current, the predetermined current can be set by "predetermined current=Vgs/resistance of resistor 109". That is, in the above case, the resistance of the resistor 109 is determined by "Vgs/predetermined current=30 Ω".

As in the description of the first embodiment, the connection arrangement of the secondary current emission loop is formed by the loop that starts from the transformer 104 and includes the main capacitor 113, the constant-voltage diode 124 and resistor 109, and the high-voltage rectifying diode 110. With this arrangement of the secondary current emission loop, the gate-to-source signal of the FET 123 is not directly influenced by noise of the transformer 104, since such noise is blocked by the high-voltage rectifying diode 110, and the noise never exceeds Vgs. Hence, the secondary current IC input signal as a drain signal becomes a signal free from any operation errors, and stable operation of the circuit is assured.

According to each of the above embodiments, in the strobe charge apparatus, which has the FET 105 that serves as a first switching element for turning on/off a power supply to be supplied to the primary coil of the transformer 104, which is equipped in the flyback booster circuit that charges the main capacitor 113, the microcomputer 103*a* serving as a primary drive control means for performing drive control of the FET 105, and a secondary current detection means for detecting, as a secondary current, a charged current of the main capacitor 113 charged by a current generated in the secondary coil after the drive of the primary coil of the transformer 104 is stopped, and in which since the secondary current detection means detects that the secondary current drops to be equal to or lower than a predetermined current, the microcomputer 103*a* that serves as the primary drive control means supplies a drive signal to the FET 105 for a predetermined period of time, the secondary current detection means comprises the transistor 108 serving as a second switching element, and the resistor 109 (example of FIG. 1), or the FET 123 serving as a second switching element, and the resistor 109 (example of FIG. 9). Hence, a fast and highly efficient charge operation can be implemented by a simple circuit arrangement without being influenced by noise.

Figure 25:
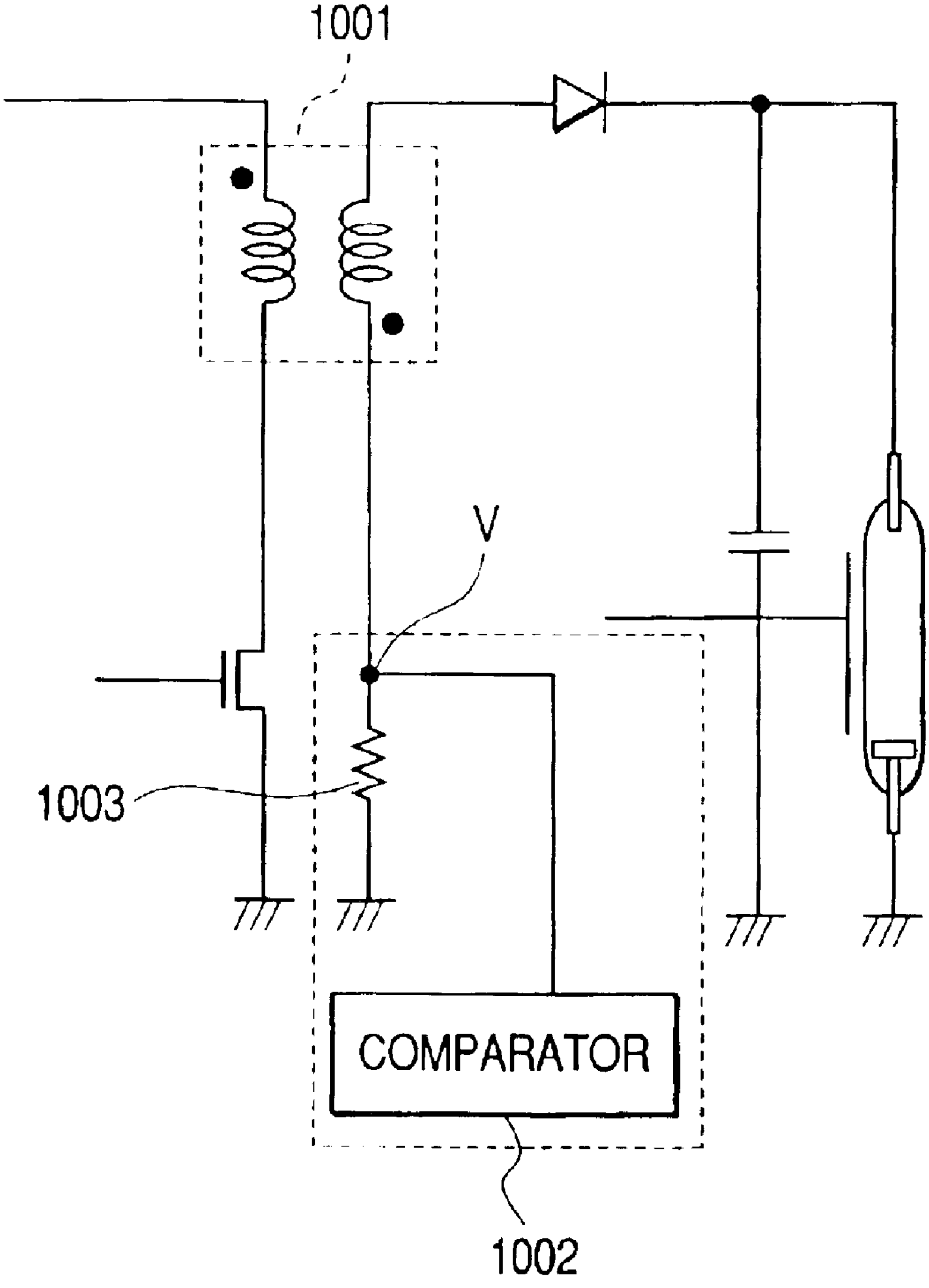
FIG. 25 is a block diagram showing a conventional booster circuit used in a strobe charge operation.

More specifically, for example, in case of the arrangement of FIG. 1, since the resistor 109 connected to the base-emitter path of the transistor 108 emits oscillating energy due to the stray capacitance on the primary side of the transformer 104, and suppresses a voltage rise of the emitter, inversion of oscillating energy results in small noise since the oscillating energy is reduced before inversion, thus preventing operation errors. Unlike in the arrangement shown in FIG. 25 that executes a charge operation by detecting if the secondary current is approximately 0 mA (a state wherein the secondary current of a predetermined current level remains cannot be detected), since the secondary current that has dropped to the predetermined current can be detected, a fast and highly efficient charge operation can be made.

Since the transistor 108 is used as the second switching element, as shown in FIG. 1, the secondary current can be detected by a simple circuit arrangement. Or since the FET 123 is used as the second switching element, as shown in FIG. 9, the secondary current can be detected within a shorter response time than that when the transistor 108 is used.

Since the predetermined current used upon detecting the state of the secondary current is set by the resistor 109 connected to the base-emitter path of the transistor 108 in the arrangement shown in FIG. 1 or by the resistor 109 connected to the gate-source path of the FET 123 in the arrangement shown in FIG. 9, the magnitude of the predetermined current can be easily set.

Since the arrangement shown in FIG. 1 adopts a circuit arrangement in which the emitter of the transistor 108 as a building component of the secondary current detection means is connected to the anode of the high-voltage rectifying diode 110, the base of the transistor 108 is connected to the negative electrode of the main capacitor 113, and the cathode of the high-voltage rectifying diode 110 is connected to the transformer 104, a signal (secondary current IC input signal) used to detect the secondary current can be nearly free from noise, and stable circuit operation can be assured.

Since the arrangement shown in FIG. 9 adopts a circuit arrangement in which the source of the FET 123 as a building component of the secondary current detection means is connected to the anode of the high-voltage rectifying diode 110, the gate of the FET 123 is connected to the negative electrode of the main capacitor 113, and the cathode of the high-voltage rectifying diode 110 is connected to the transformer 104, a signal (secondary current IC input signal) used to detect the secondary current can be nearly free from noise, and stable circuit operation can be assured.

Also, as shown in FIG. 9, since the constant-voltage diode 124 is connected to the gate-source path of the FET 123, the gate voltage of the FET 123 can be prevented from exceeding its withstand voltage.

(Third Embodiment)

Figure 11:
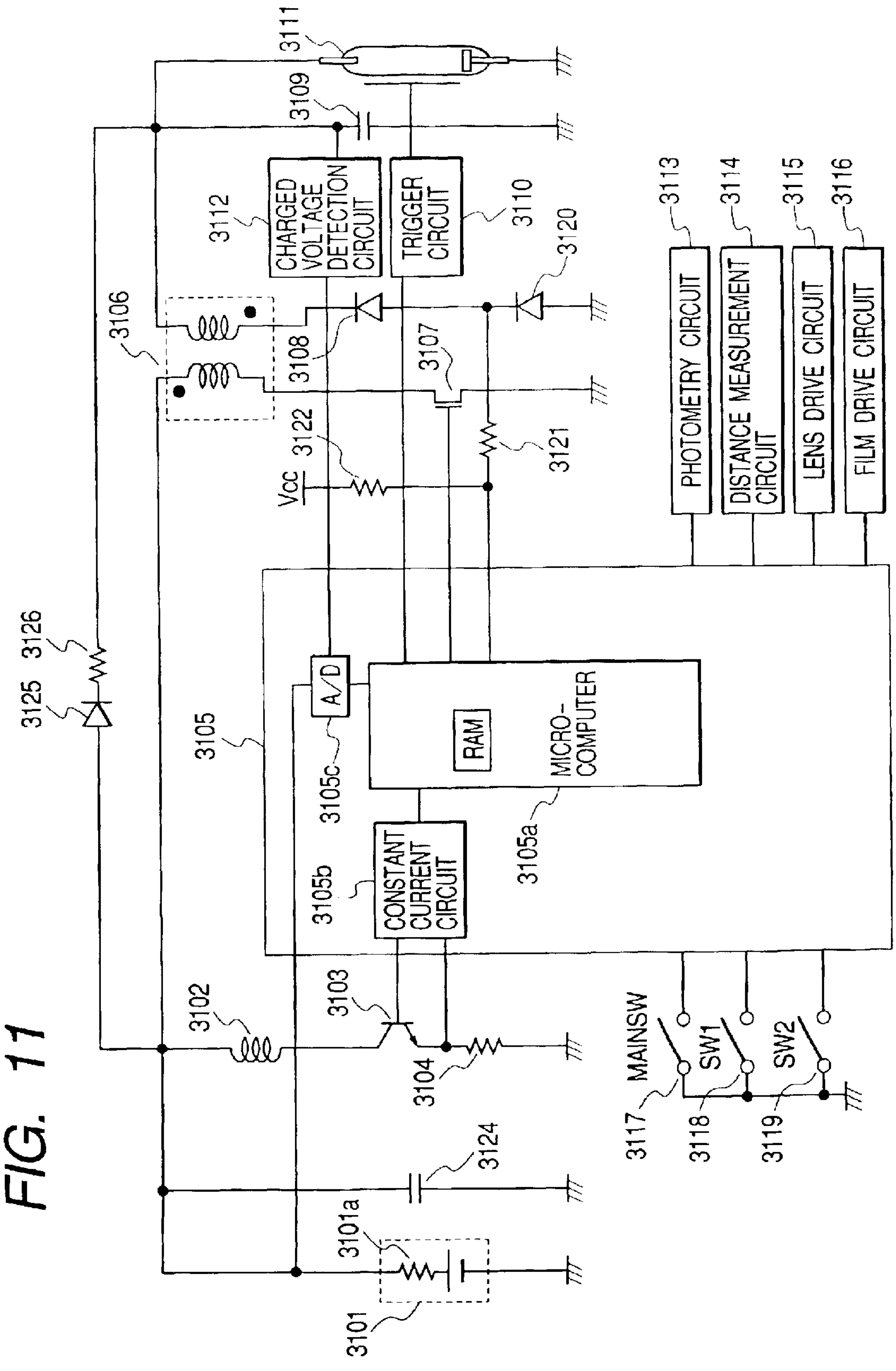
FIG. 11 is a block diagram showing the circuit arrangement of principal part of a camera according to the third embodiment of the present invention.

FIG. 11 is a block diagram showing the circuit arrangement of principal part of a camera that includes a flyback DC/DC converter according to the third embodiment of the present invention.

Referring to FIG. 11, a battery 3101 serves as a power supply, and includes a power supply internal resistor 3101*a*. A capacitor 3124 is connected in parallel with the battery 3101. A transistor 3103 drives a shutter coil 3102. A resistor 3104 is used to detect a current upon driving the shutter coil 3102 based on a constant current. A control IC 3105 controls a camera sequence such as photometry, distance measurement, lens drive, film feed, and the like of a camera, and also a strobe device associated with the present invention. A microcomputer 3105*a* has a RAM serving as a memory, and controls the camera sequence. A constant current circuit 3105*b* controls the transistor 3103 to drive the shutter coil 3102 based on a constant current. An A/D converter 3105*c* converts an input voltage into digital data.

A transformer 3106 accumulates energy in a core by flowing a current in a loop of the positive electrode of the battery, a primary coil, and the negative electrode of the battery, and generates a counter electromotive force by that energy. A FET (field effect transistor) 3107 drives a current in the primary coil of the transformer 3106. A main capacitor 3109 accumulates a charge. The cathode of a high-voltage rectifying diode 3108 is connected to the tongue of the secondary coil of the transformer 3106, and its anode is connected to the cathode of a diode 3120 (to be described below). The anode of the diode 3120 is connected to the negative electrode of the main capacitor 3109, and its cathode is connected to the anode of the high-voltage rectifying diode 3108. A charge current loop for accumulating the counter electromotive force generated by the secondary coil of the transformer 3106 on the main capacitor 3109 is formed by the main capacitor 3109, diode 3120, and high-voltage rectifying diode 3108.

One terminal of a resistor 3121 is connected to the cathode of the diode 3120, and the other terminal is connected to the control IC 3105. A resistor 3122 pulls up the input of the control IC 3105, to which the resistor 3121 is connected, to an auxiliary power supply Vcc, which is boosted by a DC/DC converter (not shown) to be higher than the battery voltage. Note that the ratio of the resistance of the resistor 3122 to that of the resistor 3121 is around "10 to 50" to "1". The anode of a diode 3125 is connected to the positive electrode of the battery. A resistor 3126 forms a series circuit with the diode 3125, and that series circuit is connected between the positive electrodes of the main capacitor 3109 and battery 3101. The diode 3125 and resistor 3126 set the voltage of the main capacitor 3109 to be the battery voltage, thus preventing any circuit operation errors (secondary current detection errors to be described later) around 0 V.

A trigger circuit 3110 is connected to a discharge tube 3111. The discharge tube 3111 emits light based on a charge accumulated on the main capacitor 3109 in response to a trigger voltage received from the trigger circuit 3110. A charged voltage detection circuit 3112 is connected to the A/D converter 3105*c* in the control IC 3105, and detects a voltage accumulated on the main capacitor 3109. A photometry circuit 3113 detects an object luminance. A distance measurement circuit 3114 detects the distance to an object. A lens drive circuit 3115 drives a photographing lens on the basis of the detection result from the distance measurement circuit 3114 to focus an object image on the film surface. A film feed (drive) circuit 3116 automatically loads, winds up, and rewinds film. A main switch (MAINSW) 3117 is used to set the camera in a photographing ready state. A switch 3118 (SW1) is turned on at the first stroke position of a shutter button. When the switch SW1 is turned on, electric circuits in the camera are enabled to start detection processes such as photometry, distance measurement, and the like. A switch 3119 (SW2) is turned on at the second stroke position of the shutter button. When the shutter SW2 is turned on, it generates a startup signal for a photographing sequence after the switch SW1 is ON.

The operation of the DC/DC converter will be described below with reference to the timing charts in FIGS. 12A to 12C.

Signals shown in the timing charts in FIGS. 12A to 12C will be explained first. Referring to FIGS. 12A to 12C, "primary current" indicates a current that flows through the primary coil of the transformer 3106, "secondary current" indicates a current that flows through the secondary coil of the transformer 3106, and "FETGATE" indicates an input signal to the gate of the FET 3107. "Secondary current IC input signal" indicates a secondary current detection signal to which the resistors 3121 and 3122 are connected on the circuit, and which is connected to the control IC 3105.

Figure 12A:
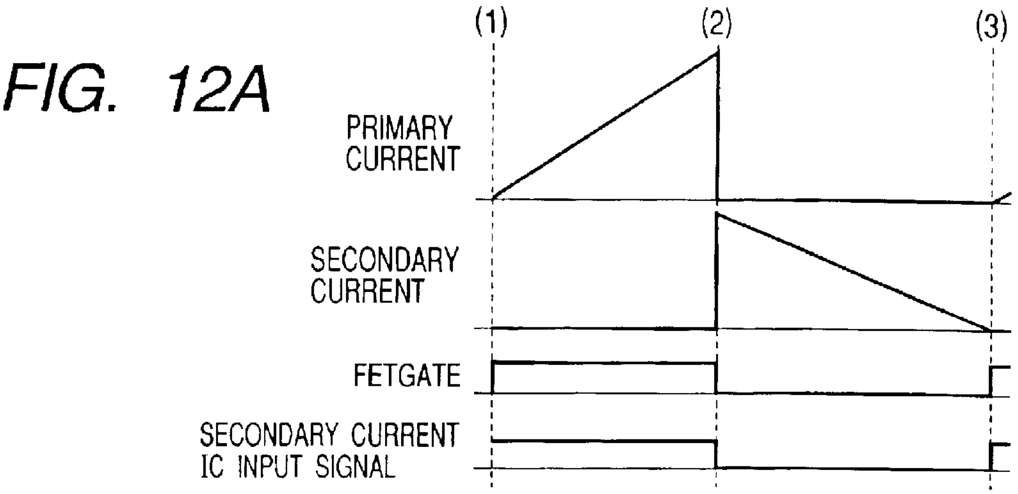
FIGS. 12A, 12B and 12C are timing charts of a DC/DC converter according to the third embodiment of the present invention.
Figure 12B:
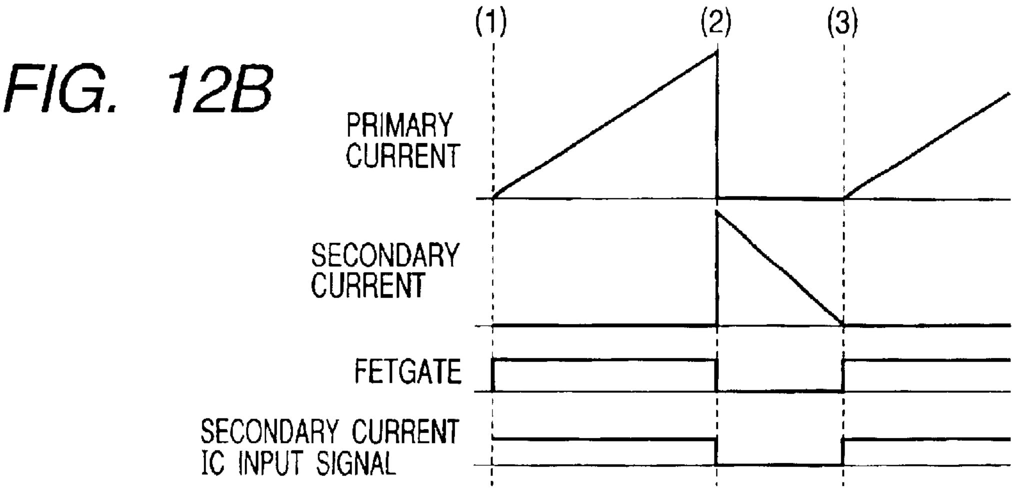
Figure 12C:
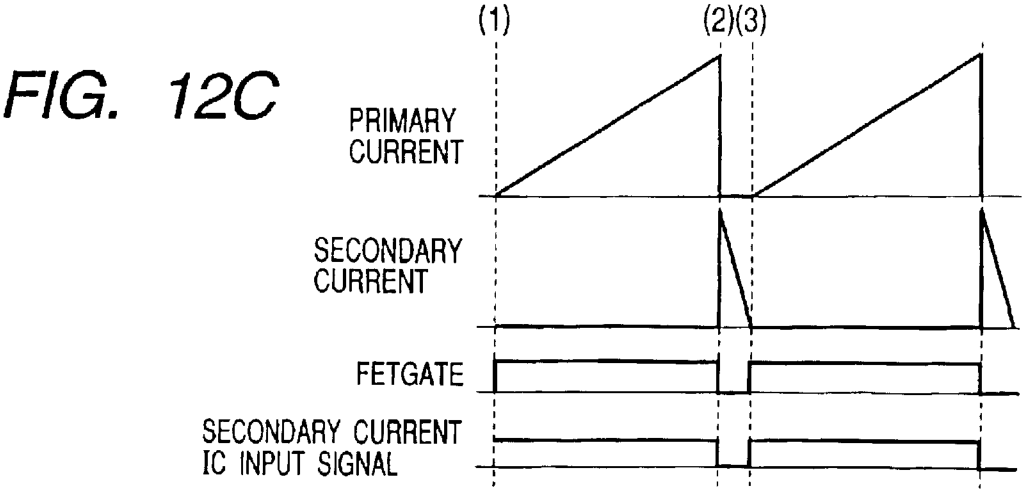

FIGS. 12A, 12B, and 12C respectively show the states of signals when the charged voltage is low, middle, and high.

The operation of the DC/DC converter will be explained below.

The control IC 3105 supplies a predetermined oscillation signal to the gate of the FET 3107 via a connection terminal (timing (1) of "FETGATE" in FIGS. 12A to 12C). In this way, a high-level signal is supplied to the control electrode of the FET 3107, and a current ("primary current" in FIGS. 12A to 12C) flows through a loop of the positive electrode of the battery, the primary coil of the transformer 3106, the drain-source path of the FET 3107, and the negative electrode of the battery. As a result, an induced electromotive force is generated at the secondary coil of the transformer 3106. In this case, since this current has a polarity blocked by the high-voltage rectifying diode 3108, no excitation current flows from the transformer 3106, and energy is accumulated in the core of the transformer 3106. This energy accumulation (current drive) is done from the beginning of drive to a predetermined time measured by a timer (to timing (2) of "FETGATE" in FIGS. 12A to 12C).

After current drive has been done to the predetermined time, the gate of the FET 3107 is set at low level to turn off the FET 3107 (timing (2) of "FETGATE" in FIGS. 12A to 12C), thus cutting off the current and disabling the circuit.

As a result, a counter electromotive force is generated in the secondary coil of the transformer 3106. This counter electromotive force flows, as a secondary current, from the transformer 3106 in the loop of the main capacitor 3109, diode 3120, and high-voltage rectifying diode 3108 (timing (2) to timing (3) of "secondary current" in FIGS. 12A to 12C), thereby accumulating a charge on the main capacitor 3109. A secondary current IC input signal changes to low level simultaneously with the beginning of emission of the secondary current in response to a shunt current of the secondary current from Vcc via the resistors 3122 and 3121 (timing (3) of "secondary current IC input signal" in FIGS. 12A to 12C).

Note that a signal input from the node between the anode of the diode 3120 and the cathode of the high-voltage rectifying diode 3108 to the control IC 3105 via the resistor 3121 suffers less noise, since the current loop is formed from the secondary coil of the transformer 3106 in the order of the main capacitor 3109, diode 3120, and high-voltage rectifying diode 3108.

Energy accumulated in the transformer 3106 is emitted, and the secondary current IC input signal that maintains low level due to the shunt current of the secondary current is inverted from low level to high level (timing (3) of "secondary current IC input signal" in FIGS. 12A to 12C) when the secondary current disappears (timing (3) of "secondary current" in FIGS. 12A to 12C). In response to the secondary current IC input signal which has been inverted from low level to high level, the control IC 3105 generates a high-level signal to the gate of the FET 3107 to enable the FET 3107 again (timing (1) of "FETGATE" in FIGS. 12A to 12C) as in the aforementioned primary current drive, thus accumulating energy in the transformer 3106 for a predetermined period of time. After an elapse of the predetermined period of time, the FET 3107 is disabled by a low-level signal to make the transformer 3106 emit the accumulated energy, thus accumulating a charge on the main capacitor 3109.

By repeating the aforementioned operations:

(1) start primary current drive (timing (1) of timing chart);

(2) stop primary current drive after an elapse of a predetermined period of time (timing (2) of timing chart);

(3) detection of disappearance of the secondary current (timing (3) of timing chart); and (4) start primary current drive (timing (1) of timing chart), (timings (1) and (3) have nearly the same timings), the charged voltage of the main capacitor 3109 rises.

The charge operation in the third embodiment of the present invention has been explained. Note that the operation flows of the aforementioned circuit are as shown in FIGS. 6, 7, and 8 above.

(Fourth Embodiment)

Figure 13:
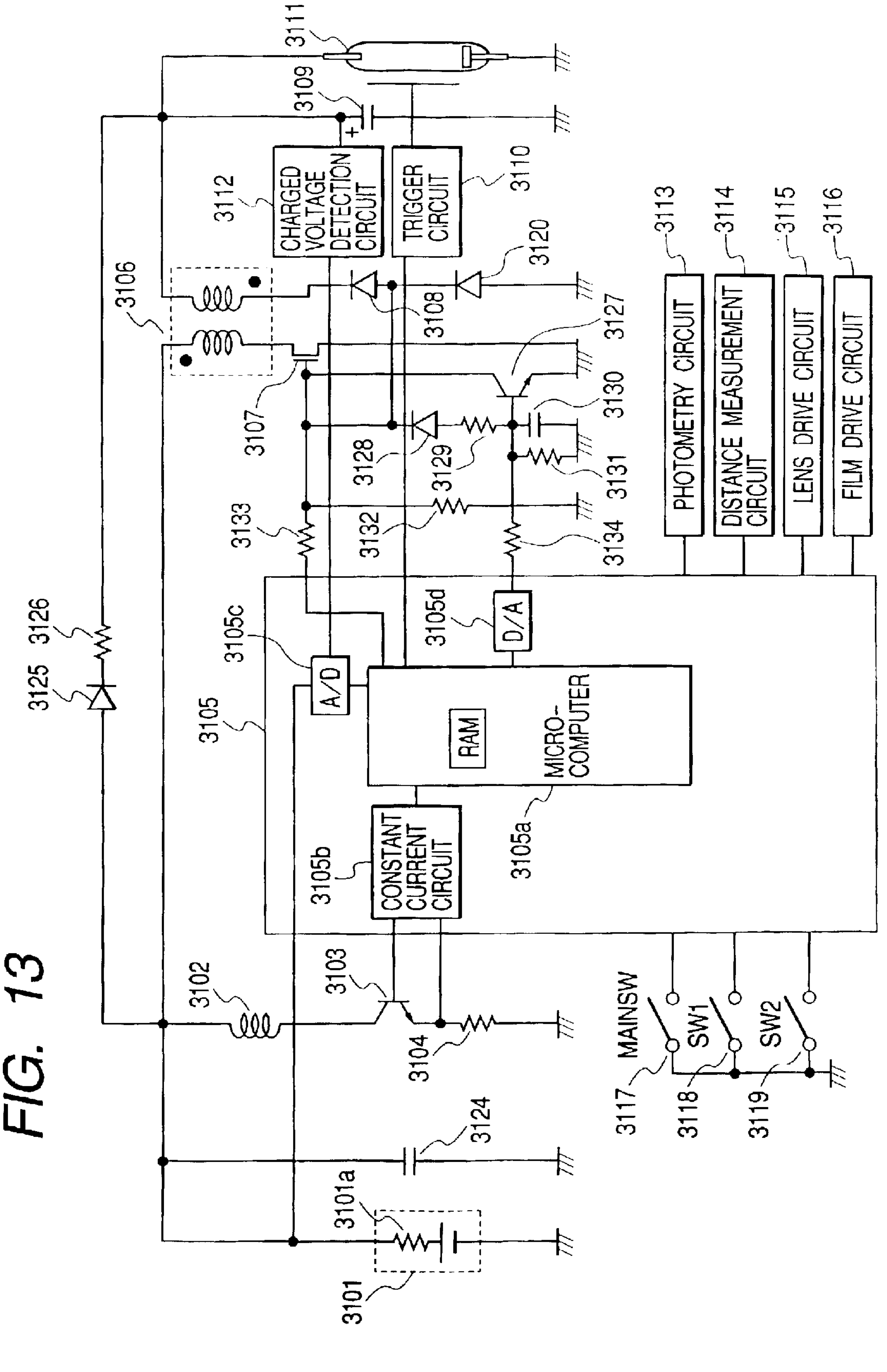
FIG. 13 is a block diagram showing the circuit arrangement of principal part of a camera according to the fourth embodiment of the present invention.

FIG. 13 is a block diagram showing the circuit arrangement of principal part of a camera that includes a flyback DC/DC converter according to the fourth embodiment of the present invention.

In FIG. 13, components 3101 to 3120, and 3124 to 3126 are the same as those in FIG. 11 described in the third embodiment, and a description thereof will be omitted.

Components to be added in FIG. 13 to the arrangement in FIG. 11 will be explained below.

Referring to FIG. 13, a D/A converter 3105*d* is incorporated in the control IC 3105. The emitter of a transistor 3107 is connected to the GND, and its collector is connected to the gate of the FET 3107, the anode of the diode 3108, the cathode of the diode 3120, the cathode of a diode 3128, and resistors 3132 and 3133, which components will be described later. The base of the transistor 3127 is connected to a resistor 3129, capacitor 3130, and resistors 3131 and 3134 (to be described later). When the charged voltage on the capacitor 3130 has reached Vbe, the transistor 3127 is turned on and sets the gate of the FET 3107 at low level to stop its drive. The cathode of the diode 3128 is connected to the gate of the FET 3107 and the resistor 3133 (to be described later), and its anode is connected to the resistor 3129 (to be described below). One terminal of the resistor 3129 is connected to the anode of the diode 3128. The resistor 3129 and diode 3128 discharge the capacitor 3130 while a secondary current of the transformer 3106 flows.

One terminal of the capacitor 3130 is connected to the resistor 3129, and the other terminal is connected to GND. The resistor 3131 is connected in parallel with the capacitor 3130. One terminal of the resistor 3132 is connected to the gate of the FET 3107, and the other terminal is connected to GND. One terminal of the resistor 3133 is connected to the control IC 3105, and the other terminal is connected to the gate of the FET 3107. One terminal of the resistor 3134 is connected to the control IC 3105, and the other terminal is connected to the base of the transistor 3127.

The D/A converter 3105*d*, resistors 3131 and 3134, and capacitor 3130 form a timer which measures the drive time of a primary current (drive time of the FET 3107). Note that the resistor 3131 has a higher resistance than that of the resistor 3134, and does not largely influence the timer.

The operation of the DC/DC converter will be described below using the timing charts shown in FIGS. 14A to 14C.

Signals shown in the timing charts in FIGS. 14A to 14C will be explained first. Referring to FIGS. 14A to 14C, "GATEON" indicates a signal which is connected from the control IC 3105 to the resistor 3133. "D/AOUT" indicates a voltage which is set by the D/A converter 3105*d* in the control IC 3105, i.e., a voltage to be applied to the resistor 3134. "Primary current" indicates a current that flows through the primary coil of the transformer 3106, "secondary current" indicates a current that flows through the secondary coil of the transformer 3106, "FETGATE" indicates an input signal to the gate of the FET 3107 on the boost circuit, and "transistor base potential" indicates the potential at the base of the transistor 3127.

Figure 14A:
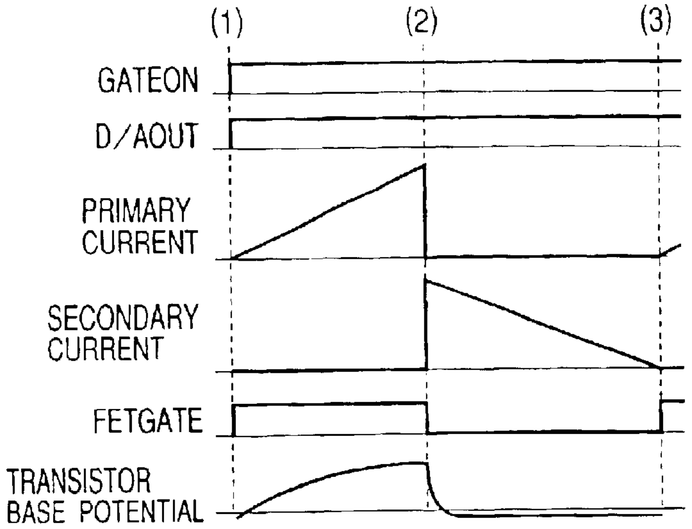
FIGS. 14A, 14B and 14C are timing charts of a DC/DC converter according to the fourth embodiment of the present invention.
Figure 14B:
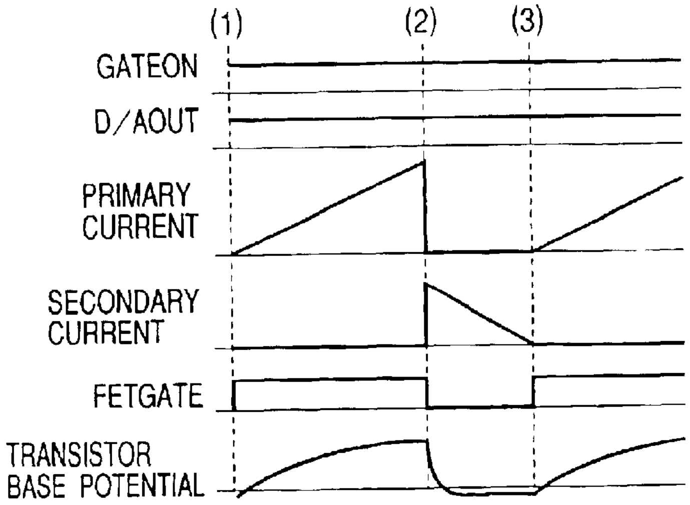
Figure 14C:
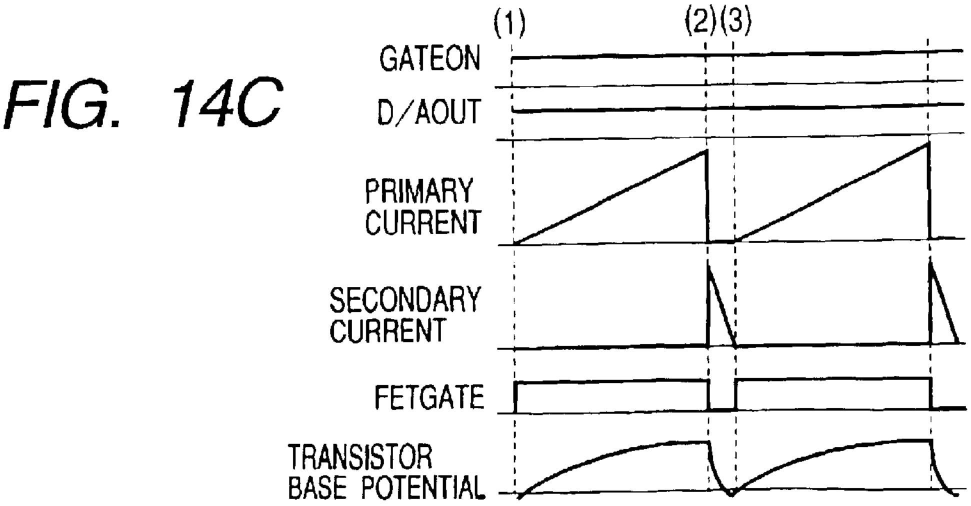

FIGS. 14A, 14B, and 14C respectively show the signals when the charged voltage is low, middle, and high.

The operation of the DC/DC converter will be explained below.

The D/A converter 3105*d* in the control IC 3105 outputs a voltage, which is set at a predetermined voltage (timing (1) of "D/AOUT" in FIGS. 14A to 14C). At substantially the same time with the output from the D/A converter 3105*d*, the control IC 3105 outputs an oscillation start signal to the gate of the FET 3107 via a connection terminal (timing (1) of "GATEON" in FIGS. 14A to 14C). This signal is supplied to the control electrode of the FET 3107 via the resistor 3133 as a high-level signal. In response to this signal, the FET 3107 is turned on, and a current ("primary current" in FIGS. 14A to 14C) flows through a loop of the positive electrode of the battery, the primary coil of the transformer 3106, the drain-source path of the FET 3107, and the negative electrode of the battery. As a result, an induced electromotive force is generated at the secondary coil of the transformer 3106. In this case, since this current has a polarity blocked by the high-voltage rectifying diode 3108, no excitation current flows from the transformer 3106, and energy is accumulated in the core of the transformer 3106.

Based on the output from the D/A converter 3105*d*, the base potential of the transistor 3125, to which a time constant circuit formed by the resistors 3131 and 3132, and capacitor 3128 is connected, begins to rise. This time constant can be arbitrarily set by the output voltage from the D/A converter 3105*d*. When the base potential of the transistor 3127 has reached Vbe (timing (2) of "transistor base potential" in FIGS. 14A to 14C), the voltage of the capacitor 3130 enables the transistor 3127 to be on. As a result, the gate signal of the FET 3107 changes to low level, and the FET 3107 is disabled.

In this manner, a counter electromotive force is generated in the secondary coil of the transformer 3106. This counter electromotive force flows, as a secondary current, from the transformer 3106 in the loop of the main capacitor 3109, diode 3120, and high-voltage rectifying diode 3108 (timing (2) to timing (3) of "secondary current" in FIGS. 14A to 14C), thereby accumulating a charge on the main capacitor 3109. Since such current loop from the secondary coil is formed, a signal input from the node between the anode of the diode 3120 and the cathode of the high-voltage rectifying diode 3108 to the gate of the FET 3107 suffers less noise as in the third embodiment.

While the secondary current flows in the loop of the main capacitor 3109, diode 3120, and high-voltage rectifying diode 3108, a charge accumulated on the capacitor 3130 is emitted via the diode 3128 and resistor 3129 connected to the anode of the high-voltage rectifying diode 3108 and the cathode of the diode 3120. Note that the potential of the capacitor 3130 becomes lower than the Vbe voltage, but the gate of the FET 3107, which is pulled up by a control signal ("GATEON" in FIGS. 14A to 14C) from the control IC 3105 via the resistor 3133, maintains low level during emission of the secondary current since the transistor 3127 is connected to the anode of the high-voltage rectifying diode 3108 and the cathode of the diode 3120, and the FET 3107 remains disabled. Then, energy accumulated in the transformer is emitted, and the FET 3107 is inverted from low level to high level (timing (3) of "FETGATE" in FIGS. 14A to 14C) since the secondary current stops, so as to restart current drive to the primary coil (timing (3) of "primary current" in FIGS. 14A to 14C), thus beginning to accumulate energy on the transformer 3106, as described above.

Charge accumulation on the capacitor 3130, which is discharged due to emission of the secondary current and is in a reset state, starts since the secondary current stops. As described above, current drive to the primary coil is done for a predetermined period of time until the voltage of the capacitor 3130 connected to the base of the transistor 3127 reaches Vbe. When the voltage of the capacitor 3130 has reached Vbe, the FET 3107 is disabled, energy accumulated on the transformer 3106 is emitted, and a charge is accumulated on the main capacitor 3109. By repeating these operations, the voltage of the main capacitor 3109 rises.

The charge operation in the fourth embodiment of the present invention has been explained.

Figure 15:
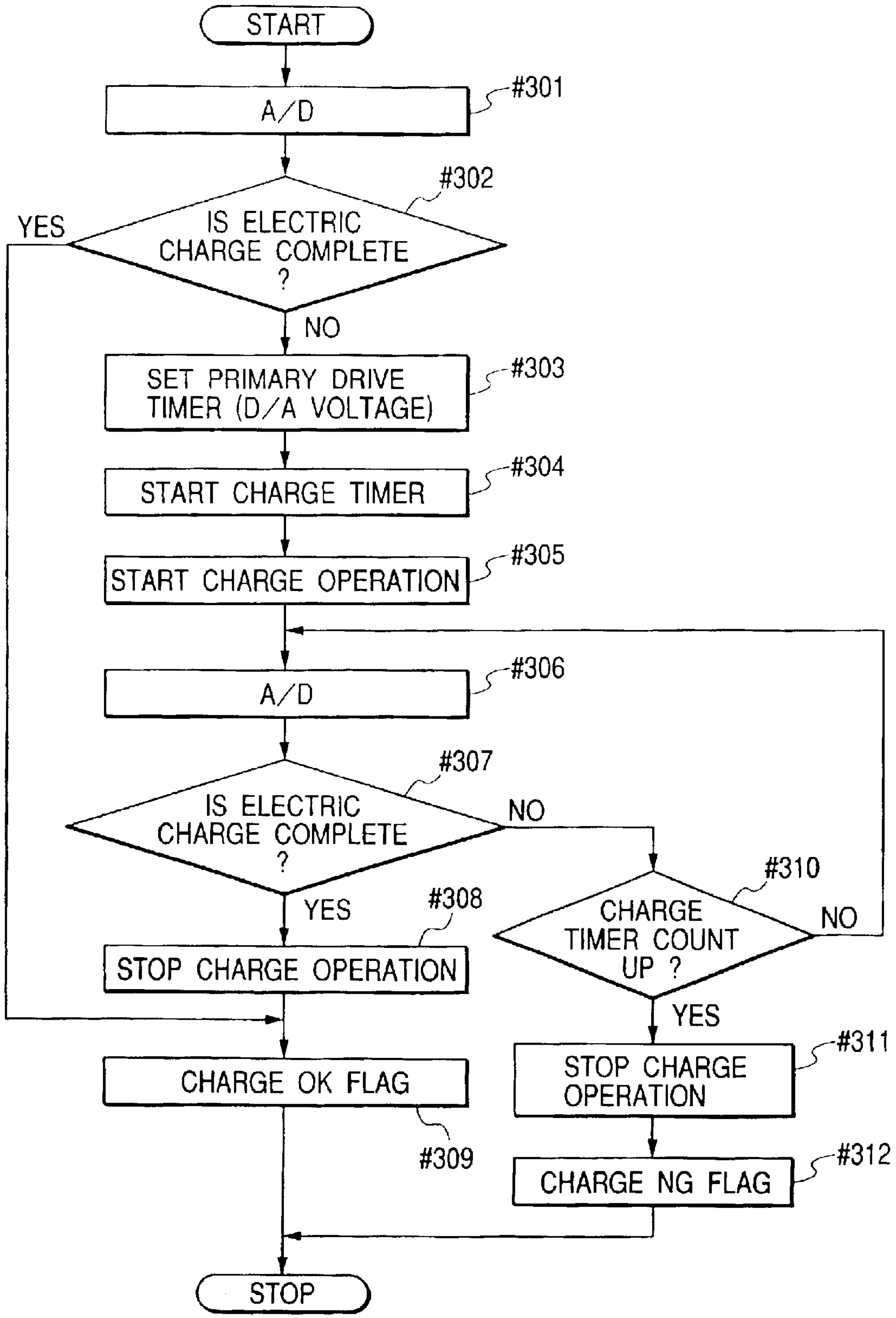
FIG. 15 is a flow chart showing the strobe charge operation of the camera according to the fourth embodiment of the present invention.

The operation of the converter with the above arrangement will be described below with reference to the flow chart in FIG. 15. This operation corresponds to the flash mode in step #406 in FIG. 6 and steps #109 and #117 in FIG. 8.

In step #301, detection of the charged voltage of the main capacitor 3109 is done by detecting a voltage divided by the charged voltage detection circuit 3112 by the A/D converter 3105*c* in the control IC 3105, and the detection result is stored in the RAM in the microcomputer 3105*a*. It is checked in step #302 based on the detection result obtained in step #301 if a charge completion voltage has been reached. If YES in step #302, the flow jumps to step #309 to set a charge OK flag, thus ending the charge sequence.

On the other hand, if it is determined in step #302 that the charge completion voltage has not been reached yet, the flow advances to step #303 to set a voltage of the D/A converter 3105*d*, so as to set the drive time of the primary coil. A charge timer is started in step #304, and the aforementioned GATEON signal is generated in step #305, thus starting the aforementioned charge operation.

The flow then advances to step #306, and the A/D converter 3105*d* in the control IC 3105 detects the charged voltage based on a voltage via the charged voltage detection circuit 3112. The detection result is stored in the RAM in the control IC 3105. It is checked in step #307 if the charged voltage detected in step #306 has reached a charge completion voltage. If NO in step #307, the flow advances to step #310 to check if the charge timer that has been started in step #304 has measured a predetermined period of time (count up). If YES in step #310, the flow advances to step #311 to stop the charge operation that has been started in step #305. In step #312, a charge NG flag is set, thus ending the charge sequence.

On the other hand, if it is determined in step #310 that the charge timer has not measured a predetermined period of time, the flow returns to step #306 to repeat operations in steps #306→#307→#310→#306, . . . . After that, if it is detected in step #307 that the charge completion voltage has been reached, the flow advances to step #308 to stop the charge operation. In step #309, a charge OK flag is set, thus ending the charge sequence.

In the fourth embodiment, the timer that measures the drive time of the primary current is set using the D/A converter. Alternatively, the output from the D/A converter may be fixed at a predetermined voltage, and the resistor 3134 may comprise a variable resistor as a timer setting means so as to set the timer time.

On the other hand, a drive means for driving the primary current may use a transistor in accordance with the voltage of the primary current drive signal or a circuit arrangement.

According to each of the above embodiments, upon detection of disappearance of the secondary current after the primary side drive is stopped, the primary side drive is started for the next predetermined period of time (timing (2) in FIGS. 12A to 12C and FIGS. 14A to 14C). With this control, the charge loss time can be minimized. That is, a quick charge operation can be assured.

Since the means for detecting the secondary current comprises the diode 3120 and high-voltage rectifying diode 3108, and adopts an arrangement in which the cathode of the diode 3120 is connected to the anode of the high-voltage rectifying diode 3108, the anode of the diode 3120 is connected to the negative electrode of the main capacitor 3109, and the cathode of the high-voltage rectifying diode 3108 is connected to the transformer 3106, disappearance of the secondary current can be detected using a signal which suffers less noise, thus allowing a stable circuit operation.

Since a predetermined time for driving the FET 3107 is set using an arbitrarily variable counter, the drive current to the primary coil of the transformer 3106 can be controlled.

Since the predetermined time for driving the FET 3107 is measured by a CR timer which comprises the resistors 3134 and 3131 and capacitor 3130, the control-IC which has no counter can be used. Also, since the predetermined time is set based on the output from the D/A converter 3105*d*, the drive time of the primary side of the transformer 3106 can be variably set using the output voltage of the D/A converter. Or the resistor 3134 may comprise a variable resistor, and the drive time of the primary side of the transformer 3106 may be set by adjusting the variable resistor.

Since the transformer 3106 is turned on/off by the FET, deterioration of charge efficiency due to a switching loss generated by primary current drive can be minimized, and the charge time can be improved.

Also, when the transformer 3106 is turned on/off by a transistor, such arrangement is effective for a circuit arrangement in which the voltage of the drive signal is low.

(Fifth Embodiment)

Figure 16:
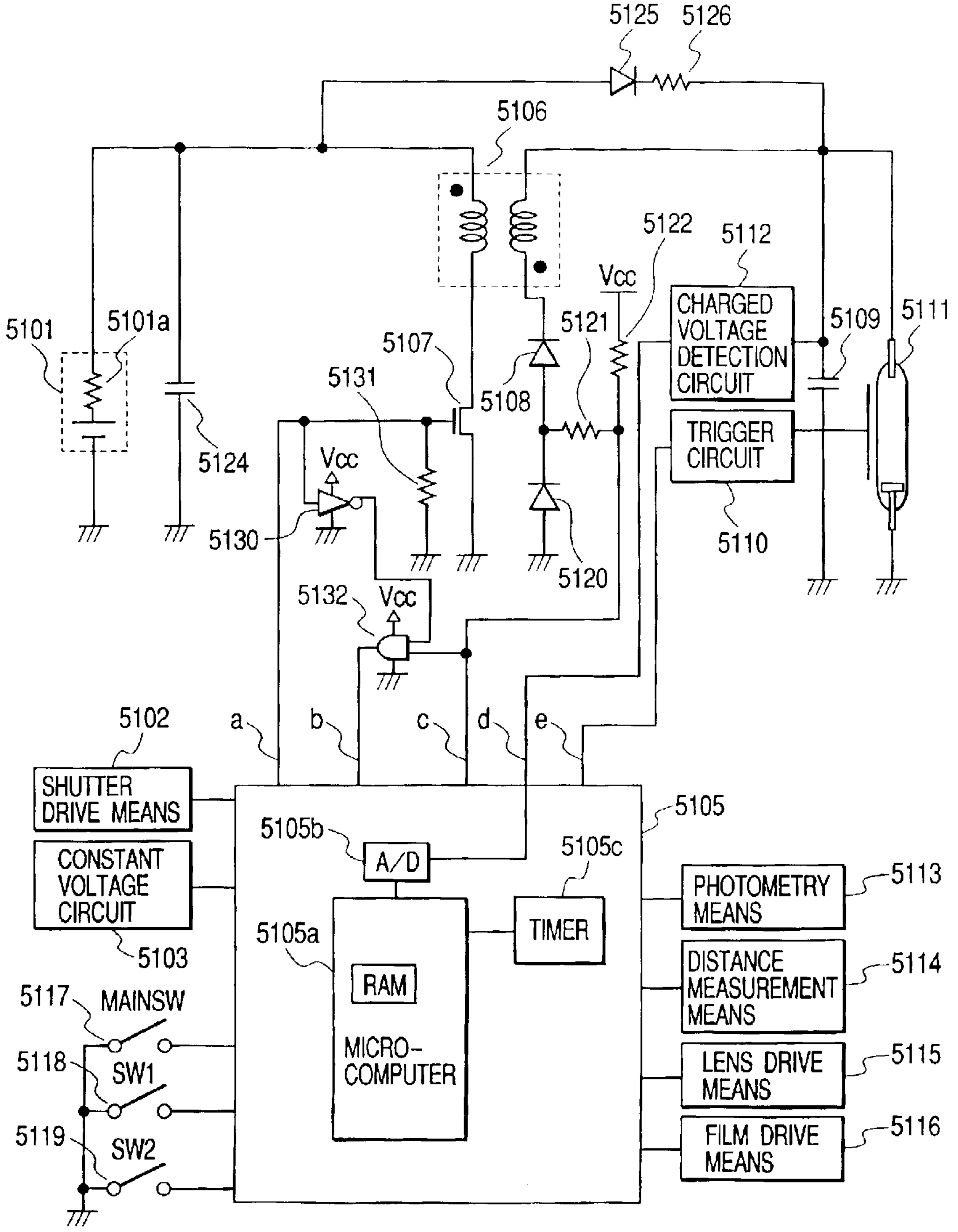
FIG. 16 is a block diagram showing the circuit arrangement according to the fifth embodiment of the present invention.

FIG. 16 shows a flyback booster circuit according to the fifth embodiment of the present invention.

A battery 5101 serves as a power supply, and includes a power supply internal resistor 5101*a*. A capacitor 5124 is connected in parallel with the battery. A control IC 5105 controls a camera sequence such as photometry, distance measurement, lens drive, film feed, and the like of a camera, and also a strobe flash device associated with the present invention. A microcomputer 5105*a* has a RAM as a storage means in the control IC, and controls the camera sequence. An A/D converter (to be referred to as A/D hereinafter) 5105*b* converts an input voltage into digital data. A timer 5105*c* measures the drive time of a primary current (to be described later). A transformer 5106 accumulates energy in a core by flowing a current in a loop of the positive electrode of the battery, a primary coil, and the negative electrode of the battery, and generates a counter electromotive force by that energy. A FET 5107 drives a current in the primary coil of the transformer 5106. A resistor 5131 pulls down the gate of the FET 5107.

A main capacitor 5109 accumulates a charge. The cathode of a high-voltage rectifying diode 5108 is connected to the tongue of the secondary coil of the transformer 5106, and its anode is connected to the cathode of a diode 5120 (to be described below). The anode of the diode 5120 is connected to the negative electrode of the main capacitor 5109, and its cathode is connected to the anode of the high-voltage rectifying diode 5108. A charge current loop for accumulating the counter electromotive force generated by the secondary coil of the transformer 5106 on the main capacitor 5109 is formed by the main capacitor 5109, diode 5120, and high-voltage rectifying diode 5108. One terminal of a resistor 5121 is connected to the cathode of the diode 5120, and the other terminal is connected to the control IC 5105. A resistor 5122 pulls up the input of the control IC 5105, to which the resistor 5121 is connected, to an auxiliary power supply Vcc, which is boosted by a DC/DC converter (not shown) to be higher than the battery voltage. Note that the ratio of the resistance of the resistor 5122 to that of the resistor 5121 is around "10 to 50" to "1". Note that the diode 5120, and resistors 5121 and 5122 form a secondary current detection circuit.

The anode of a diode 5125 is connected to the positive electrode of the battery. A resistor 5126 forms a series circuit with the diode 5125, and that series circuit is connected between the positive electrodes of the main capacitor 5109 and battery 5101. The diode 5125 and resistor 5126 set the voltage of the main capacitor 5109 to be the battery voltage, thus preventing any secondary current detection errors around 0 V. A trigger circuit 5110 is connected to a discharge tube 5111. The discharge tube 5111 emits light based on a charge accumulated on the main capacitor 5109 in response to a trigger voltage received from the trigger circuit 5110. An inverter 5130 inverts the gate signal of the FET 5107. An AND gate 5132 receives the inverted gate signal of the FET 5107, and the output from the secondary current detection circuit. Note that the inverter 5130 and AND gate 5132 form a discrimination means for checking if oscillation is stopped.

A shutter drive device 5102 drives a shutter. A constant voltage circuit 5103 supplies a control power supply as a power supply to respective circuit blocks. A charged voltage detection circuit 5112 is connected to the A/D 5105*b* in the control IC 5105, and detects a voltage accumulated on the main capacitor 5109. A photometry device 5113 detects an object luminance. A distance measurement device 5114 detects the distance to an object. A lens drive device 5115 drives a photographing lens on the basis of the detection result from the distance measurement circuit 5114 to focus an object image on the film surface. A film feed (drive) device 5116 automatically loads, winds up, and rewinds film. A main switch (MAINSW) 5117 is used to set the camera in a photographing ready state. A switch 5118 (SW1) enables electric circuits in the camera to start detection processes such as photometry, distance measurement, and the like when it is turned on at the first stroke position of a shutter button. A switch 5119 (SW2) generates a startup signal for a photographing sequence after SW1 when it is turned on at the second stroke position of the shutter button.

The overall operation flow of the camera is the same as that shown in FIG. 6, and a description thereof will be omitted.

Figure 18:
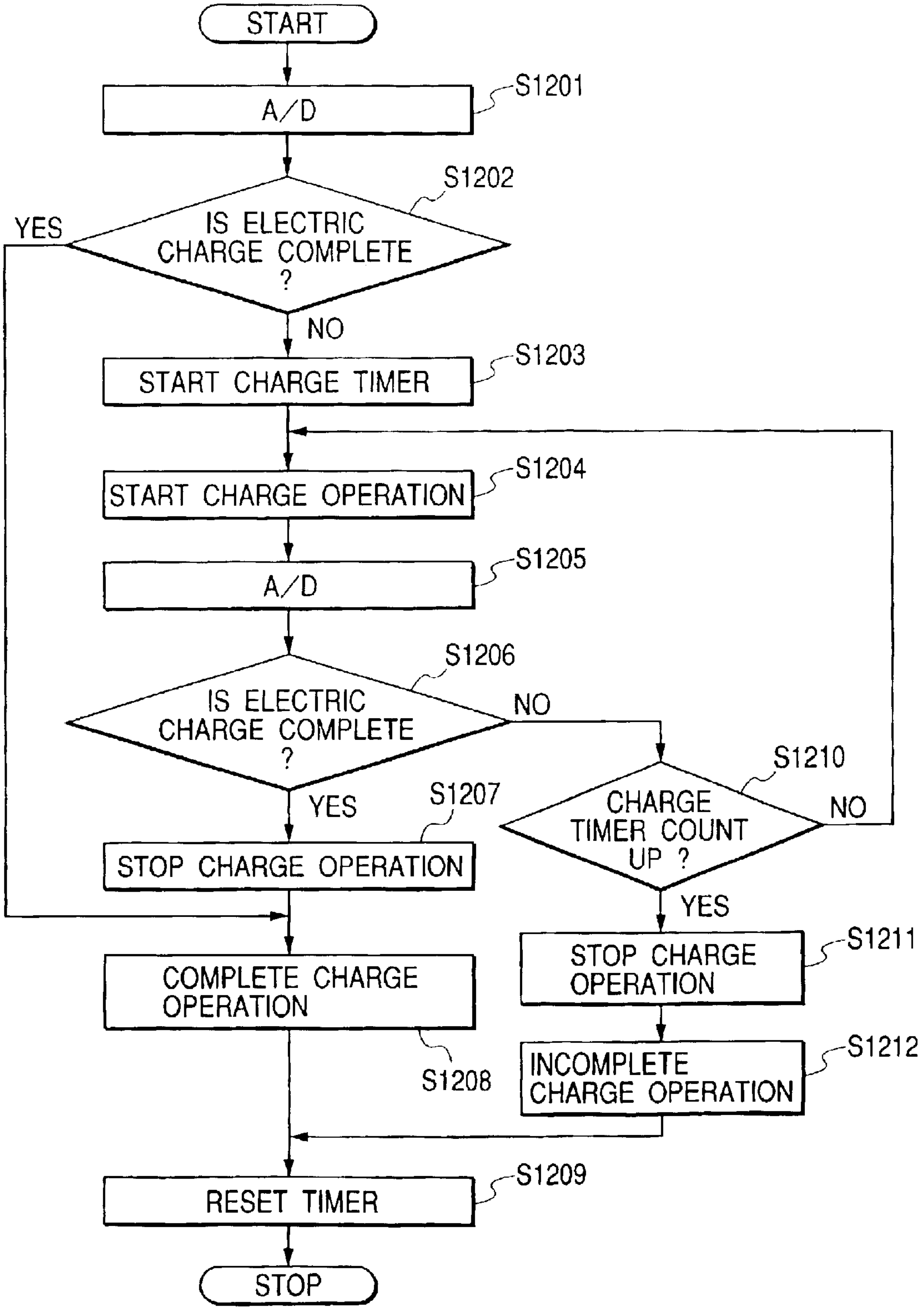
FIG. 18 is a flow chart showing the charge operation in the fifth embodiment of the present invention.

FIG. 18 is a flow chart showing the flash mode. In step S1201, detection of the charged voltage on the main capacitor is done by detecting a voltage obtained via the charged voltage detection circuit 5112 by the A/D 5105*b* in the control IC 5105, and the detection result is stored in the RAM in the microcomputer 5105*a*. It is checked in step S1202 based on the detection result obtained in step S1201 if a charge operation is complete. If the A/D result stored in the RAM in the microcomputer 5105*a* indicates a charge completion voltage, the flow jumps to step S1208 to set a charge OK flag, thus ending the charge sequence. If it is determined in step S1202 that the A/D result stored in the RAM in the microcomputer 5105*a* does not indicate a charge completion voltage, the flow advances to step S1203 to start a charge timer, thus starting a strobe charge operation based on a first charge mode (to be described later) (S1204).

The circuit operation of the booster circuit will be explained below with reference to the timing charts of FIGS. 17A and 17B.

Signals in the timing charts of FIGS. 17A and 17B will be explained first. Referring to FIGS. 17A and 17B, "primary current" indicates a current that flows through the primary coil of the transformer 5106. "Secondary current" indicates a current that flows through the secondary coil of the transformer 5106. "FETGATE" indicates a gate input signal of the FET 5107 on the circuit. "Secondary current IC input signal" indicates a secondary current detection signal to which the resistors 5121 and 5122 are connected on the circuit, and which is connected to the control IC 5105. FIG. 17A shows the operation in a first charge mode that detects the secondary current, and FIG. 17B shows signals in the second charge mode that drives using fixed pulses. In FIG. 17B, a secondary current detection signal is not shown since no secondary current detection is made.

The circuit operation in FIGS. 17A and 17B will be explained below.

A secondary current detection mode in the first charge mode will be explained first using FIG. 17A. The control IC 5105 supplies a predetermined oscillation signal to the gate of the FET 5107 via a connection terminal (timing (1) of "FETGATE" in FIG. 17A). At this time, the timer 5105*c* is set at the same time. Hence, a high-level signal is supplied to the control electrode of the FET 5107, and a current ("primary current" in FIG. 17A) flows through a loop of the positive electrode of the battery, the primary coil of the transformer 5106, the drain-source path of the FET 5107, and the negative electrode of the battery. As a result, an induced electromotive force is generated at the secondary coil of the transformer 5106. In this case, since this current has a polarity blocked by the high-voltage rectifying diode 5108, no excitation current flows from the transformer 5106, and energy is accumulated in the core of the transformer 5106. This energy accumulation (current drive) is done for a predetermined period of time, which is set in advance by the timer 5105*c* (to timing (2) of "FETGATE" in FIG. 17A).

After an elapse of the predetermined period of time set by the timer 5105*c*, the timer operation is completed, and a timer operation completion interruption signal is generated. The microcomputer 5105*a* receives the timer operation completion interruption signal (timing (2) of "timer operation completion interruption signal" in FIG. 17A), sets the gate of the FET 5107 at low level to turn off the FET 5107 (timing (2) of "FETGATE" in FIG. 17A), thus cutting off the current and disabling the circuit.

Since the FET 5107 is turned off, a counter electromotive force is generated in the secondary coil of the transformer 5106. This counter electromotive force flows, as a secondary current, from the transformer 5106 in the loop of the main capacitor 5109, diode 5120, and high-voltage rectifying diode 5108 (timing (2) to timing (3) of "secondary current" in FIG. 17A), thereby accumulating a charge on the main capacitor 5109. A secondary current IC input signal changes to low level simultaneously with the beginning of emission of the secondary current in response to a shunt current of the secondary current from Vcc via the resistors 5122 and 5121 (timing (2) of "secondary current IC input signal" in FIG. 17A).

Figure 17A:
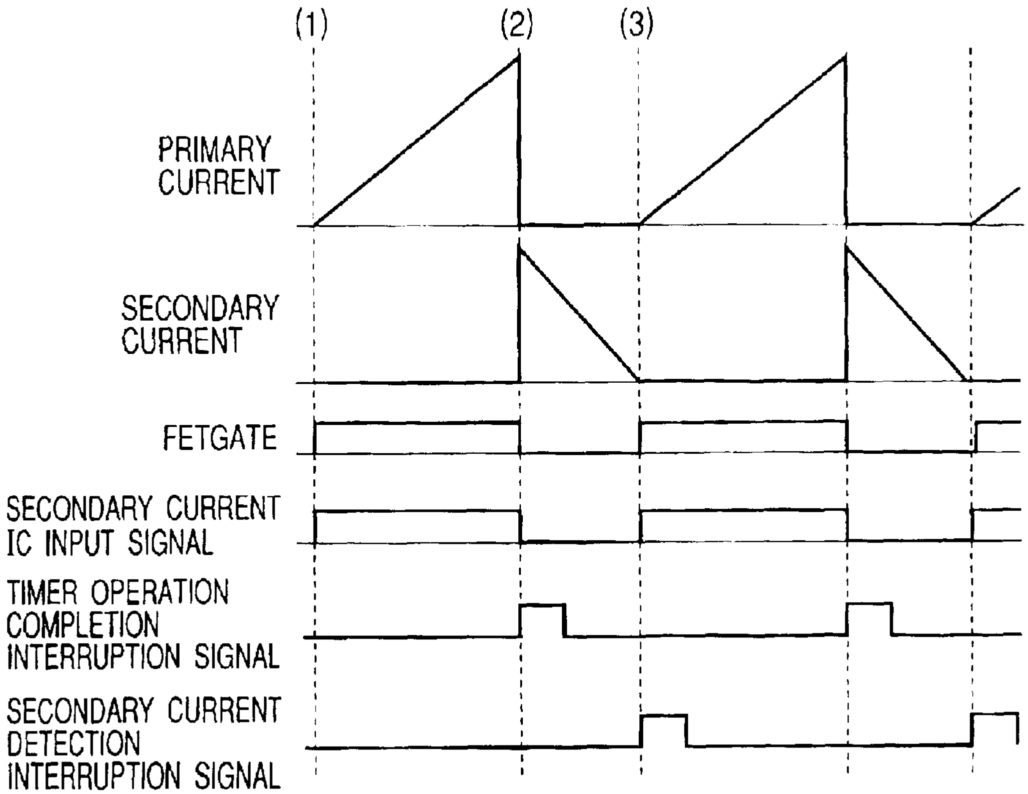
FIGS. 17A and 17B are timing charts upon executing a charge operation by a booster circuit shown in FIG. 16.

Energy accumulated in the transformer 5106 is emitted, and the secondary current IC input signal that maintains low level due to the secondary current is inverted from low level to high level (timing (3) of "secondary current IC input signal" in FIG. 17A) when the secondary current is emitted (timing (3) of "secondary current" in FIG. 17A).

In response to the secondary current IC input signal which has been inverted from low level to high level, a secondary current detection interruption signal is generated. The microcomputer 5105*a* receives this secondary current detection interruption signal (timing (3) of "secondary current detection interruption signal in FIG. 17A), and the control IC 5105 generates a high-level signal to the gate of the FET 5107 again.

As in the aforementioned primary drive, the FET 5107 is enabled again (timing (3) of "FETGATE" in FIG. 17A), and energy is accumulated on the transformer 5106 until the predetermined period of time elapses. After an elapse of the predetermined period of time, the FET 5107 is disabled by a low-level signal to emit the accumulated energy from the transformer 5106, and a charge is accumulated on the main capacitor 5109. By repeating the aforementioned operations, the voltage of the main capacitor 5109 rises.

The second charge mode using fixed pulses will be explained below.

Since the aforementioned primary drive is equivalent to that of the first charge mode in FIG. 17A, a detailed description thereof will be omitted. The FET 5107 is enabled (timing (1) of "FETGATE" in FIG. 17B) to accumulate energy on the transformer 5106 until a predetermined period of time elapses. After an elapse of the predetermined period of time, the FET 5107 is disabled by a low-level signal (timing (2) of "FETGATE" in FIG. 17B). Since the FET 5107 is turned off, a counter electromotive force is generated in the secondary coil of the transformer 5106, and the transformer 5106 emits the accumulated energy to accumulate a charge on the main capacitor 5109. After an elapse of a fixed OFF time Toff, the control IC 5105 generates a high-level signal to the gate of the FET 5107 again (timing (3) of "FETGATE" in FIG. 17B).

Figure 17B:
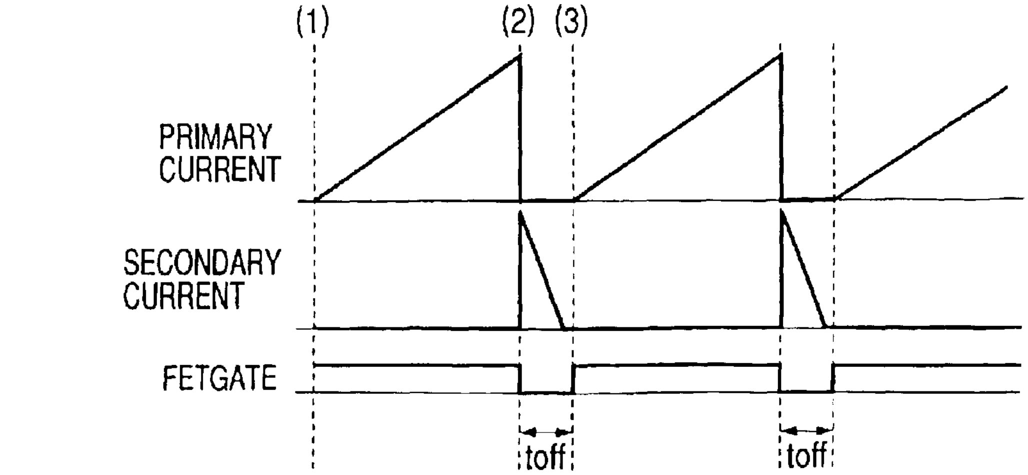

As in the aforementioned primary drive, the FET 5107 is enabled again (timing (3) of "FETGATE" in FIG. 17B), and energy is accumulated on the transformer 5106 until the predetermined period of time elapses. After an elapse of the predetermined period of time, the FET 5107 is disabled by a low-level signal to emit the accumulated energy from the transformer 5106, and a charge is accumulated on the main capacitor 5109. By repeating the aforementioned operations, the voltage of the main capacitor 5109 rises.

Upon executing the operation in the first charge mode, the microcomputer executes a timer interruption process, as described above. This operation will be described in detail below.

Figure 19A:
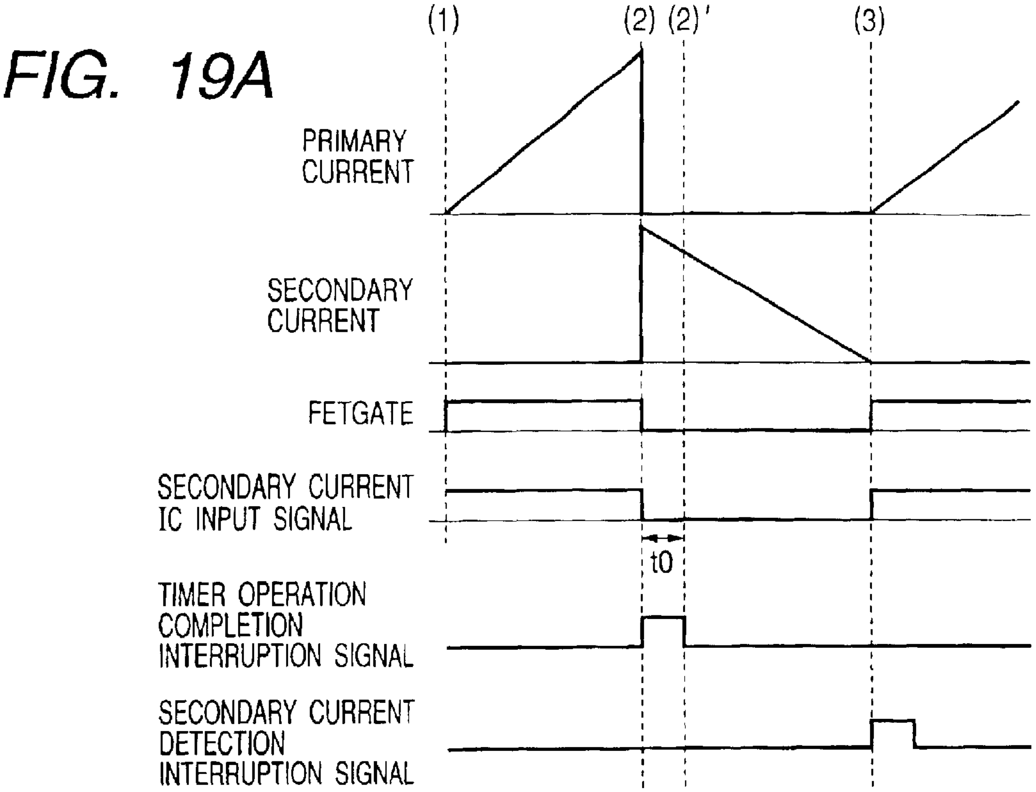
FIGS. 19A and 19B are timing charts for explaining an interruption process.

After the microcomputer has completed the primary drive for the predetermined period of time measured by the timer, as described above, it receives a timer operation completion interruption signal that completes the timer operation (timing (2) of "timer operation completion interruption signal" in FIG. 19A), and sets the gate of the FET at low level (timing (2) of "FETGATE" in FIG. 19A), as described above. Upon completion of emission of the secondary current, the secondary current IC input signal changes from low level to high level (timing (3) of "secondary current IC input signal" in FIG. 19A). By detecting this leading edge, the following primary drive is done. In order to detect the leading edge, status detection is made to repetitively detect by a software process until high level appears, and an interruption process to the microcomputer is executed upon detection of the leading edge.

Figure 19B:
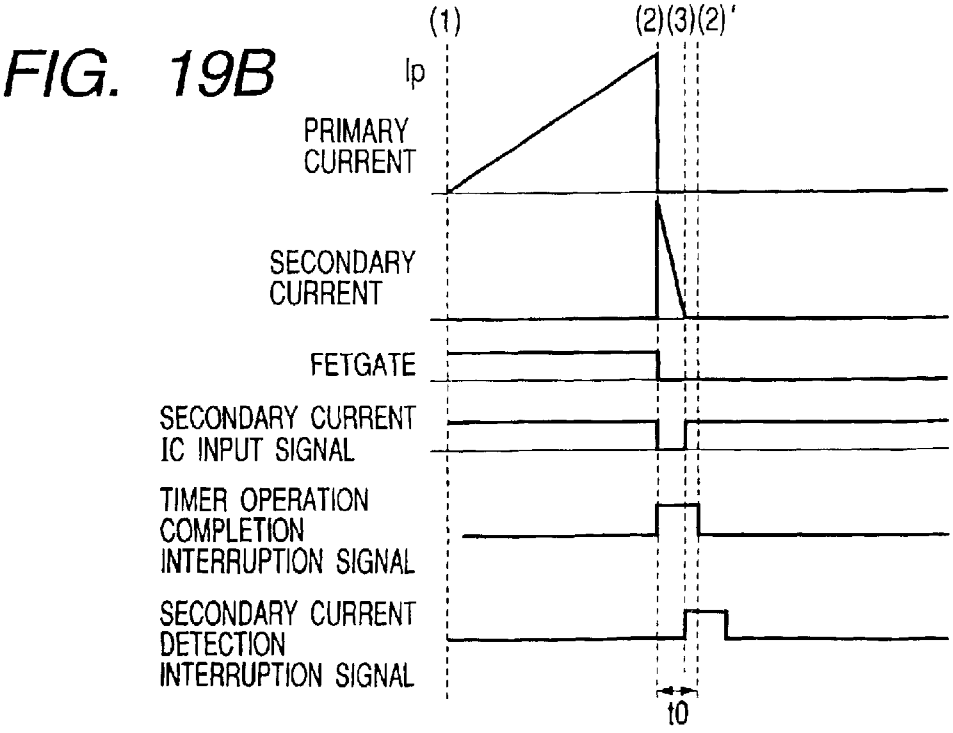

In this interruption process, the microcomputer requires a predetermined time t0 from when it accepts the interruption process until the interruption operation is finally completed, and the microcomputer is ready to receive the next interruption input signal. In FIG. 19A in which the time required until the secondary current is emitted is long, the secondary current detection interruption signal is generated in response to the secondary current IC input signal that has been inverted from low level to high level, and the microcomputer can execute the next charge operation upon receiving that signal. However, in FIG. 19B in which the time required until the secondary current is emitted is short, the secondary current detection interruption signal is generated in response to the secondary current IC input signal that has been inverted from low level to high level (timing (3) of "secondary current detection interruption signal" in FIG. 19B). However, the timer operation completion interruption operation is not completed yet at that timing (timing (3) of "timer operation completion interruption signal" in FIG. 19B), and the microcomputer cannot receive the secondary current detection interruption signal. For this reason, the next charge operation cannot be started, and oscillation may stop.

On the other hand, if control using fixed pulses in the second charge mode is executed, since the hardware timer in the microcomputer directly controls the primary drive time and fixed OFF time without detecting the secondary current, no detection error due to the interruption process is produced.

Figure 20:
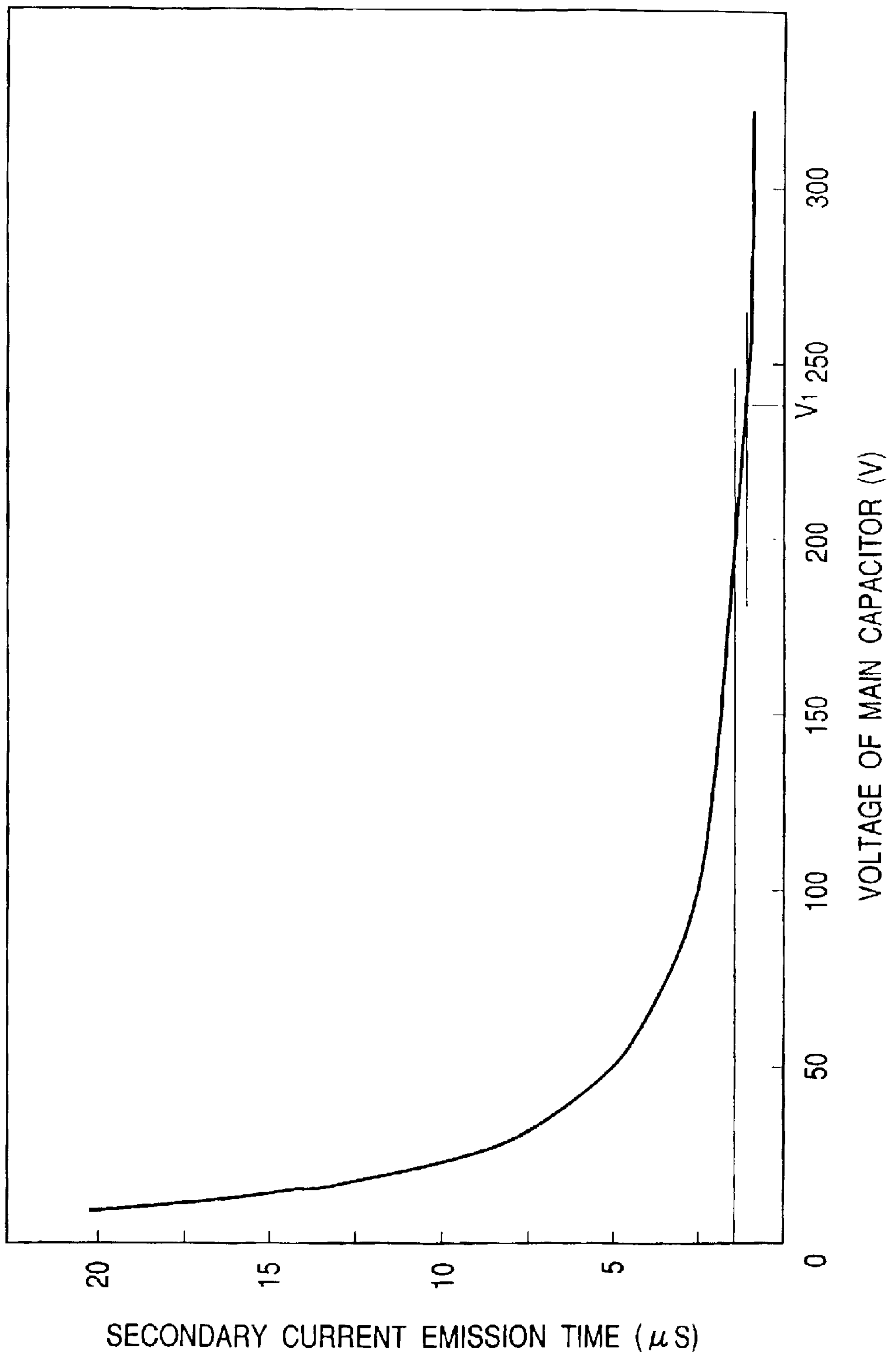
FIG. 20 is a graph for explaining the secondary current emission time characteristics.

When the charge operation starts in step S1204 in FIG. 18, as described above, the charge operation in the first charge mode that detects the secondary current is done. At this time, as the charged voltage rises, the secondary current emission time becomes short, as shown in FIG. 20. Finally, the secondary current emission time becomes as short as about 1 μsec, the secondary current detection interruption signal is generated before completion of the timer operation completion interruption process, and the microcomputer cannot accept this secondary current detection interruption signal, as described above. For this reason, the next charge operation cannot be started, and oscillation stops.

The operation of a discrimination circuit for checking if the charge operation is complete will be described below with reference to the timing chart of FIG. 22 and the flow chart of FIG. 21.

An oscillation discrimination method will be described below using the timing chart of FIG. 22. Signals in the timing chart of FIG. 22 will be described first. "Inverted signal of FETGATE" indicates the output from the inverter 5130 on the circuit in FIG. 16. "Secondary current detection IC input signal" indicates a secondary current detection signal to which the resistors 5121 and 5122 on the circuit are connected, and which is connected to the control IC 5105. Furthermore, b indicates the output signal from the AND gate 5132, which is input to a terminal b of the control IC 5105.

The operation in the first charge mode has been explained. When the gate of the FET 5107 is at high level, since the primary current flows through the oscillation transformer 5106, no secondary current flows and, hence, the secondary current detection IC input signal is at high level. By contrast, while the secondary current flows, the secondary current detection IC input signal is at low level, and the gate of the FET 5107 is at low level. Therefore, the output from the AND gate 5132 is always at low level during oscillation. When oscillation stops, both the inverted signal of the gate of the FET 5107 and secondary current detection IC input signal change to high level, and the output from the AND gate 5132 changes to high level.

According to this discrimination method, the control IC 5105 repetitively detects the output state of the AND gate 5131 within a predetermined time d1 (e.g., about 1 msec) longer than the oscillation period of this DC/DC converter, and when the control IC detects that the output from the AND gate 5132 is at high level as a state that appears while oscillation of the DC/DC converter stops, it determines that oscillation of the booster circuit stops.

Figure 21:
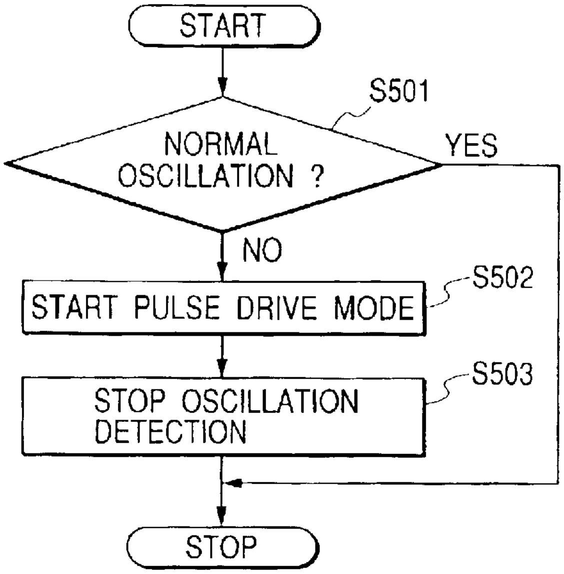
FIG. 21 is a flow chart showing the charge discrimination operation.
Figure 22:
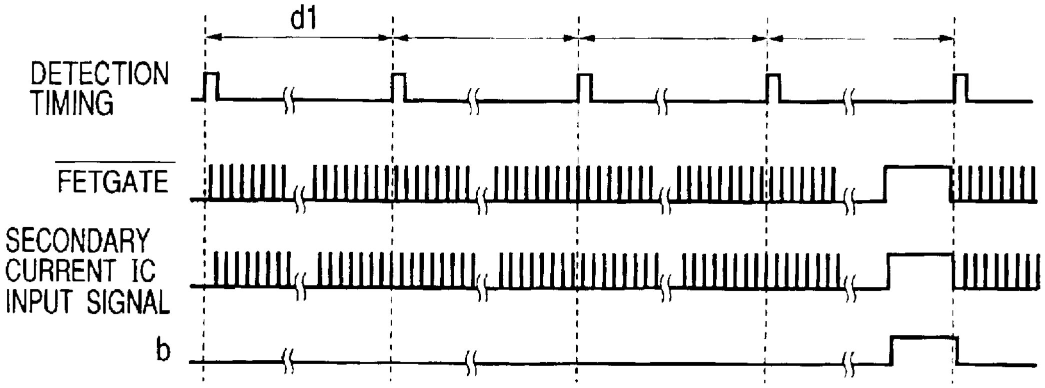
FIG. 22 is a timing chart of the charge discrimination operation.

A mode switching operation in FIG. 21 is executed while the charge operation is executed in step S1204 in FIG. 18. If the control IC 5105 detects oscillation of the DC/DC converter based on the output from the AND gate 5132, it repeats step S501. If the control IC 5105 does not detect oscillation of the booster circuit based on the output from the AND gate, since oscillation in the first charge mode that detects the secondary current stops, the control IC switches the mode from the first charge mode to the second charge mode as the control using fixed pulses to oscillate again (S502), and then inhibits the operation of this discrimination means (S503).

As described above, according to this embodiment, the charge state is discriminated during the charge operation, and if oscillation stops, the control based on detection of the secondary current is switched to the control based on fixed pulses.

With this control, even when a slow microcomputer is used, the strobe charge operation can be done without stopping oscillation.

The description will revert to the flow chart in FIG. 18. If the strobe charge operation is started (S1204), and the flow advances to step S1205, detection of the charged voltage is done by detecting a voltage obtained via the charged voltage detection circuit 5112 by the A/D 5105*b* in the control IC 5105, and the detection result is stored in the RAM in the control IC 5105. It is checked in step S1206 if the charged voltage detected in step S1205 is a charge completion voltage. If completion of the charge operation is not detected in step S1206, the flow advances to step S1210 to check if the charge timer that has been started in step S1203 has measured a predetermined period of time. If YES in step S1210, the flow advances to step S1211 to stop the charge operation that has been started in step S1204. In step S1212, a charge NG flag is set, thus ending the charge sequence.

If the charge timer has not measured the predetermined period of time, the flow returns to step S1204, the charged voltage is detected in step S1205, and steps S1206 and S1210 are repeated. If the charge completion voltage is detected in step S1206, the flow advances to step S1207 to stop the charge operation. In step S1208, a charge OK flag is set, thus ending the charge sequence.

(Sixth Embodiment)

The sixth embodiment corresponds to a modification of the fifth embodiment, and switching from the first charge mode based on detection of the secondary current to the second charge mode based on the fixed OFF time is done when the voltage on the main capacitor 5109 is equal to or higher than a predetermined voltage V1. The voltage of the main capacitor 5109 and the secondary current emission time have a relationship shown in FIG. 20, and a voltage of the main capacitor at which inversion of the secondary current IC input signal from low level to high level cannot be detected can be determined.

Since the circuit operation is the same as that in the fifth embodiment, a description thereof will be omitted. FIG. 24 is a flow chart of the strobe charge operation of the sixth embodiment, and FIG. 23 shows the circuit arrangement.

Figure 23:
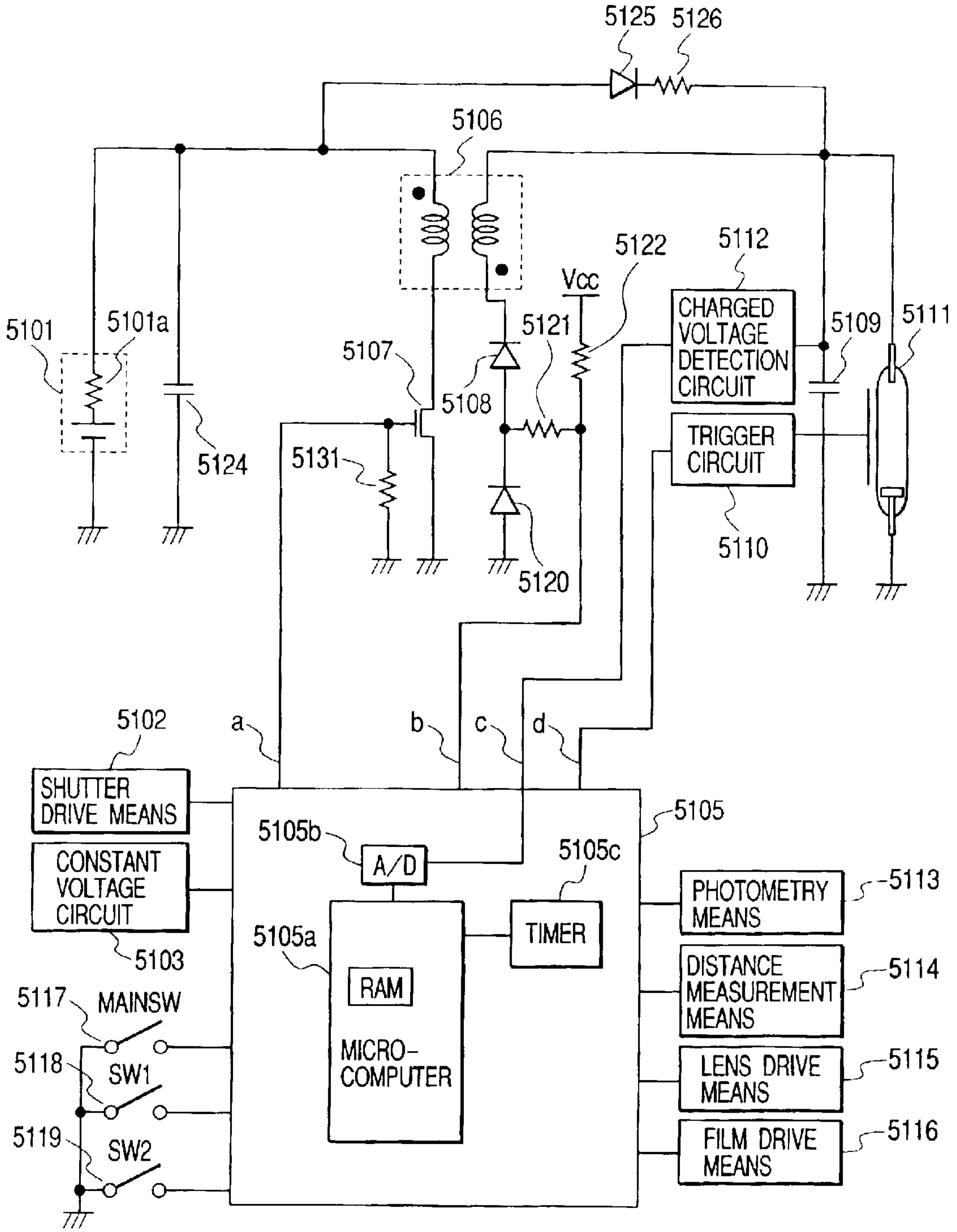
FIG. 23 is a block diagram showing the circuit arrangement according to the sixth embodiment of the present invention.
Figures 24, 24A:
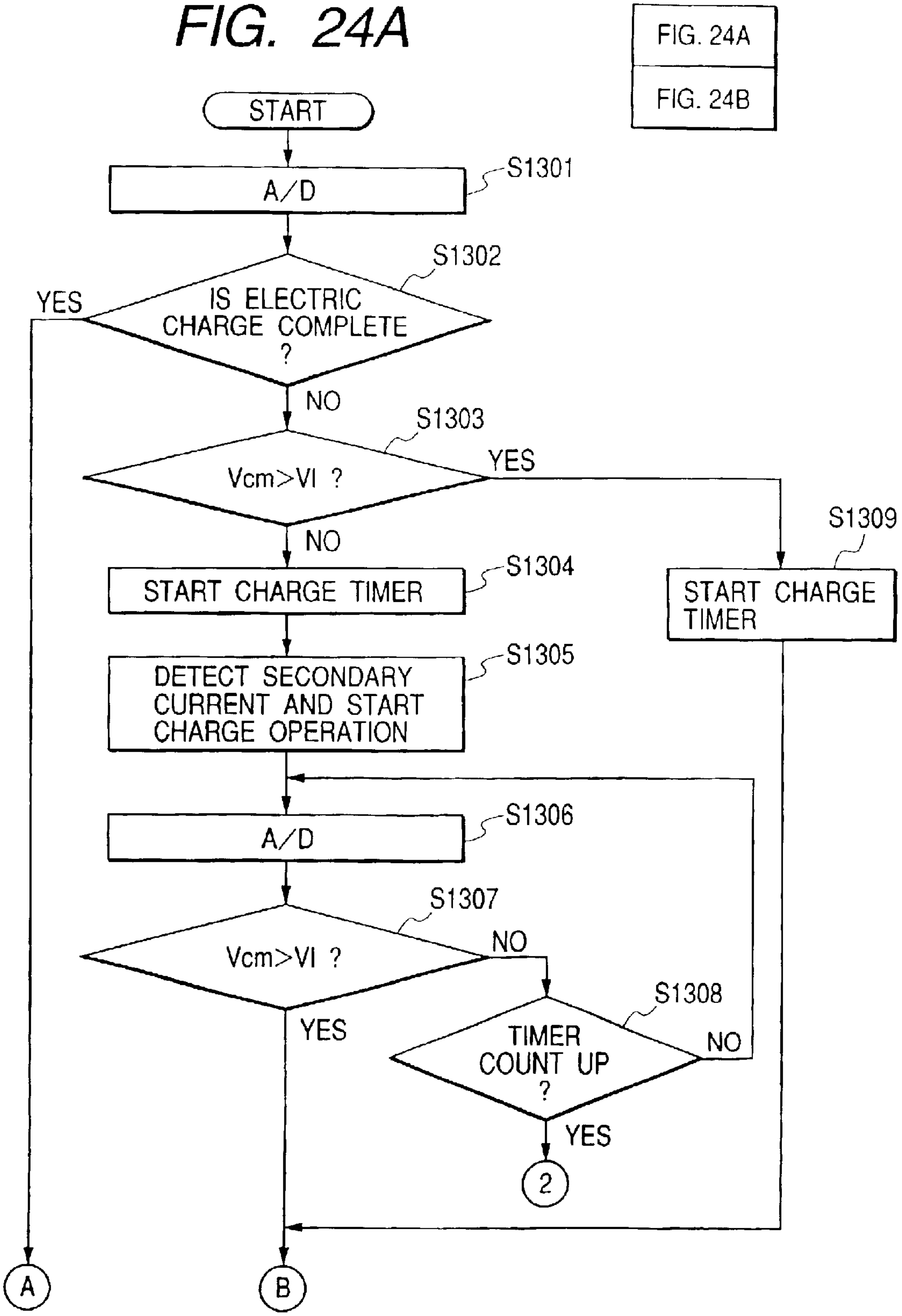
FIG. 24 is comprised of FIGS. 24A and 24B showing a flowchart explaining the charge operation in the sixth embodiment of the present invention.
Figure 24B:
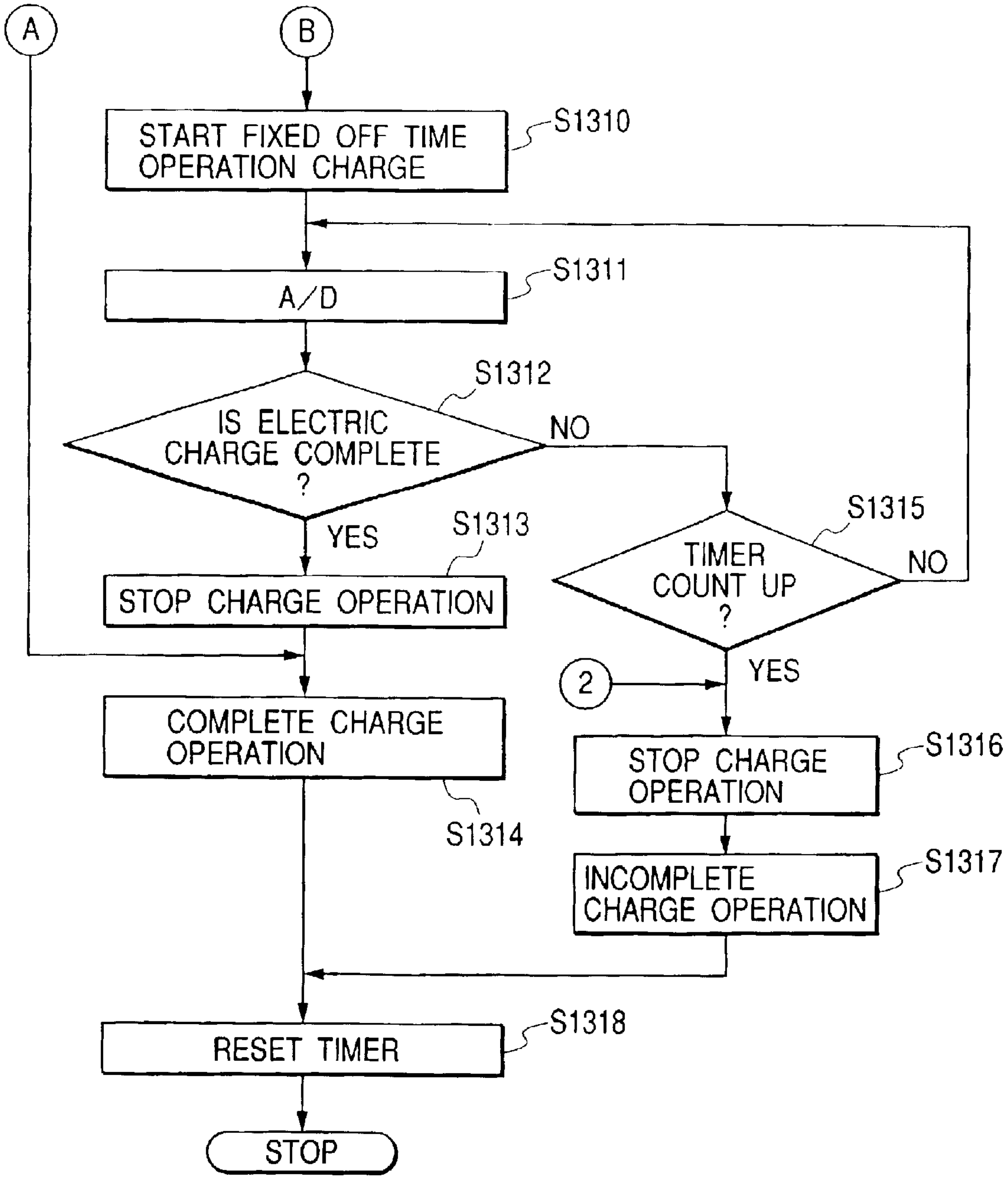

Note that the circuit arrangement in FIG. 23 is different from that in the fifth embodiment in that the inverter 5130 and AND gate 5132 corresponding to the discrimination means of the fifth embodiment are omitted, and connection between the output terminal of the AND gate 5132 and the control IC 5105 is omitted accordingly. Hence, a detailed description of the circuit arrangement will be omitted.

The strobe charge operation of the sixth embodiment will be explained below using the flow chart in FIG. 24.

In step S1301, detection of the charged voltage on the main capacitor is done by detecting a voltage obtained via the charged voltage detection circuit 5112 by the A/D 5105*b* in the control IC 5105, and the detection result is stored in the RAM in the microcomputer 5105*a*. It is checked in step S1302 based on the detection result obtained in step S1301 if a charge operation is complete. If the A/D result stored in the RAM in the microcomputer 5105*a* indicates a charge completion voltage, the flow jumps to step S1314 to set a charge OK flag, thus ending the charge sequence. If it is determined in step S1302 that the A/D result stored in the RAM in the microcomputer 5105*a* does not indicate a charge completion voltage, the flow advances to step S1303. If it is determined in step S1303 that the A/D result stored in the RAM in the microcomputer 5105*a* is higher than the predetermined voltage V1, the flow advances to step S1309 to start a charge timer. The flow then advances to step S1310 to execute the second charge mode in FIG. 17B that has been explained in the fifth embodiment. On the other hand, if it is determined in step S1303 that the A/D result stored in the RAM in the microcomputer 5105*a* is equal to or lower than the predetermined voltage V1, the flow advances to step S1304 to start the charge timer.

Then, the charge operation that detects the secondary current, as has been explained using FIG. 17A, is started (S1305). In step S1306, detection of the charged voltage is done by detecting a voltage obtained via the charged voltage detection circuit 5112 by the A/D 5105*b* in the control IC 5105, and the detection result is stored in the RAM in the microcomputer 5105*a*. If it is determined in step S1307 based on the detection result of step S1306 that the charged voltage is equal to or lower than the predetermined voltage V1, the flow advances to step S1308. It is checked if the charge timer that has been started in step S1304 has measured a predetermined period of time. If YES in step S1308, the flow jumps to step S1316 to stop the charge operation that has been started in step S1305. In step S1315, a charge NG flag is set, thus ending the charge sequence. If the charge timer has not measured the predetermined period of time, the flow returns to step S1306, steps S1306 and S1308 are repeated while executing the secondary current detection drive that has been started in step S1305. If it is detected in step S1307 that the charged voltage on the main capacitor 5109 is higher than the predetermined voltage V1, the flow advances to step S1310 to start the fixed OFF time drive that has been explained using FIG. 17B.

In the fifth and sixth embodiments, the FET 5107 is used as a switching element. However, the present invention is not limited to such specific switching element, and a bipolar transistor may be used.

What is claimed is:

1. A charge apparatus which comprises a flyback booster circuit that intermittently supplies a current to a primary coil of a transformer, and supplies a charge current from a secondary coil of the transformer to a capacitor during a period in which no current flows through the primary coil, comprising:

a detection circuit including a switching element, wherein said detection circuit detects a current that flows through the secondary coil, and said switching element changes its state from a first state to a second state when the current that flows through the secondary coil becomes not more than a predetermined value; and a coil current control circuit which starts supply of a current to the primary coil in response to said switching element, the state of which has changed from the first state to the second state.

2. An apparatus according to claim 1, wherein said coil current control circuit continues to supply the current for a predetermined period of time after the beginning of supply of the current to the primary coil.

3. An apparatus according to claim 1, wherein said switching element comprises a transistor, an emitter of which is connected to a terminal opposite to a terminal of the secondary coil, which is connected to a positive electrode of the capacitor, and a base of which is connected to a negative electrode of the capacitor.

4. An apparatus according to claim 3, wherein a diode, an anode of which is connected to the emitter of the transistor, is connected between the terminal of the secondary coil which is opposite to its terminal connected to the positive electrode of the capacitor, and the emitter of the transistor.

5. An apparatus according to claim 1, wherein said switching element comprises a FET, a source of which is connected to a terminal of the secondary coil which is opposite to its terminal connected to a positive electrode of the capacitor, and a gate of which is connected to a negative electrode of the capacitor.

6. An apparatus according to claim 5, wherein a diode, an anode of which is connected to the source of the FET, is connected between the FET and the terminal of the secondary coil which is opposite to its terminal connected to the positive electrode of the capacitor.

7. A charge apparatus which comprises a flyback booster circuit that intermittently supplies a current to a primary coil of a transformer, and supplies a charge current from a secondary coil of the transformer to a capacitor during a period in which no current flows through the primary coil, comprising:

a detection circuit which detects a current that flows through the secondary coil, said detection circuit including a first diode, a cathode of which is connected to a terminal of the secondary coil which is opposite to its terminal connected to a positive terminal of the capacitor, and a second diode, a cathode of which is connected to an anode of said first diode, and an anode of which is connected to a negative terminal of the capacitor; and a coil current control circuit which, when said detection circuit detects that the current that flows through the secondary coil becomes not more than a predetermined value, starts supply of the current to the primary coil.

8. An apparatus according to claim 7, comprises a resistor formed by serially connecting first and second resistors, and wherein, one terminal of said resistor is applied with a predetermined voltage, the other terminal thereof is connected to the cathode of said second diode, and said coil current control circuit starts supply of the current to the primary coil when a potential at a node between said first and second resistors becomes not more than a predetermined potential.

9. A charge apparatus which comprises a flyback booster circuit that intermittently supplies a current to a primary coil of a transformer, and supplies a charge current from a secondary coil of the transformer to a capacitor during a period in which no current flows through the primary coil, comprising:

a control circuit having a first operation mode which controls a current supply start timing to the secondary coil in accordance with the current that flows through the primary coil, and a second operation mode which controls the current supply start timing to the primary coil irrespective of the current that flows through the primary coil, said second operation mode starting energization after an elapse of a predetermined time after energization to the primary coil is stopped.

10. An apparatus according to claim 9, wherein said control circuit switches to control in the second operation mode when a charge operation of the capacitor stops during control in the first operation mode.

11. An apparatus according to claim 9, wherein said control circuit charges in the first operation mode after a charge operation starts, and then starts the second operation mode.

12. An apparatus according to claim 9, wherein said control circuit controls in the second operation mode when a charged voltage of the capacitor is not less than a predetermined value.

* * * * *

UNITED STATES PATENT AND TRADEMARK OFFICE

CERTIFICATE OF CORRECTION

PATENT NO. : 6,828,803 B2
DATED : December 7, 2004
INVENTOR(S) : Shoji Ichimasa et al.

It is certified that error appears in the above-identified patent and that said Letters Patent is hereby corrected as shown below:

Column 18,
Line 18, delete "control-IC" and insert -- control IC --.

Signed and Sealed this

Twenty-first Day of March, 2006

JON W. DUDAS
*Director of the United States Patent and Trademark Office*